US008533200B2

(12) United States Patent
Gelfand

(10) Patent No.: US 8,533,200 B2
(45) Date of Patent: Sep. 10, 2013

(54) APPARATUS AND METHOD FOR ORGANIZING, STORING AND RETRIEVING DATA USING A UNIVERSAL VARIABLE-LENGTH DATA STRUCTURE

(75) Inventor: Boris K. Gelfand, Chanhassen, MN (US)

(73) Assignee: Hadron Data Technologies, Inc., Long Lake, MN (US)

( * ) Notice: Subject to any disclaimer, the term of this patent is extended or adjusted under 35 U.S.C. 154(b) by 0 days.

(21) Appl. No.: 13/426,396

(22) Filed: Mar. 21, 2012

(65) Prior Publication Data

US 2012/0303630 A1    Nov. 29, 2012

Related U.S. Application Data

(60) Provisional application No. 61/564,300, filed on Nov. 28, 2011, provisional application No. 61/490,559, filed on May 26, 2011.

(51) Int. Cl.
*G06F 7/00* (2006.01)
(52) U.S. Cl.
USPC ........... 707/741; 707/769; 707/802; 707/960; 707/962
(58) Field of Classification Search
None
See application file for complete search history.

(56) References Cited

U.S. PATENT DOCUMENTS

| 5,504,891 | A  | * | 4/1996  | Motoyama et al. ........... 715/236 |
| 5,666,527 | A  | * | 9/1997  | Tatsumi et al. ...................... 1/1 |
| 6,539,388 | B1 | * | 3/2003  | Hattori et al. ........................ 1/1 |
| 6,581,058 | B1 | * | 6/2003  | Fayyad et al. ................. 707/737 |
| 6,711,563 | B1 | * | 3/2004  | Koskas .......................... 707/769 |
| 6,778,993 | B2 | * | 8/2004  | Wang .................................... 1/1 |
| 7,020,662 | B2 | * | 3/2006  | Boreham et al. .............. 707/758 |
| 7,191,183 | B1 | * | 3/2007  | Goldstein ..................... 707/602 |
| 7,197,509 | B2 | * | 3/2007  | Foster et al. ......................... 1/1 |
| 7,464,095 | B2 | * | 12/2008 | Vadavia .............................. 1/1 |
| 7,599,948 | B2 | * | 10/2009 | Thompson et al. ................... 1/1 |
| 8,126,929 | B2 | * | 2/2012  | Bhattacharjee et al. ...... 707/802 |
| 8,229,918 | B2 | * | 7/2012  | Branscome et al. .......... 707/713 |
| 8,321,485 | B2 | * | 11/2012 | Yasuda et al. ................. 707/830 |
| 8,401,998 | B2 | * | 3/2013  | Madhavarapu et al. ...... 707/655 |

OTHER PUBLICATIONS

"What are the Features of HADRON in SQL Server DENALI", by Mahesh Gupta, Dec. 10, 2010.*
"Overview of AlwaysOn Availability Groups (SQL Server)", by Thomas Lee, Microsoft Paper, Nov. 29, 2010.*
"AlwaysON—HADRON Learning Series—What Is HADRON?", by Bob Dorr, Dec. 7, 2010.*

* cited by examiner

*Primary Examiner* — Fred I Ehichioya
*Assistant Examiner* — Hasanul Mobin

(57) ABSTRACT

A method and apparatus implementing a "hadron" data structure architecture. In some embodiments, each hadron includes a frame identifier and a holder for a payload of data, wherein the plurality of hadron data structures are stored in a hadron block that provides a specification that includes metadata that specifies the payload. Some embodiments include a plurality of hadron blocks first and second hadron data blocks, each block including one or more hadron pages. Upon receiving data particles of a dataset, the system forms a first plurality of hadron data structures (hadrons) by creating a first frame identifier and associating the first frame identifier with a first data particle to form the first hadron, and creating a second frame identifier and associating the second frame identifier with a second data particle to form the second hadron, and stores the first plurality of hadron data structures in the first hadron page.

13 Claims, 16 Drawing Sheets

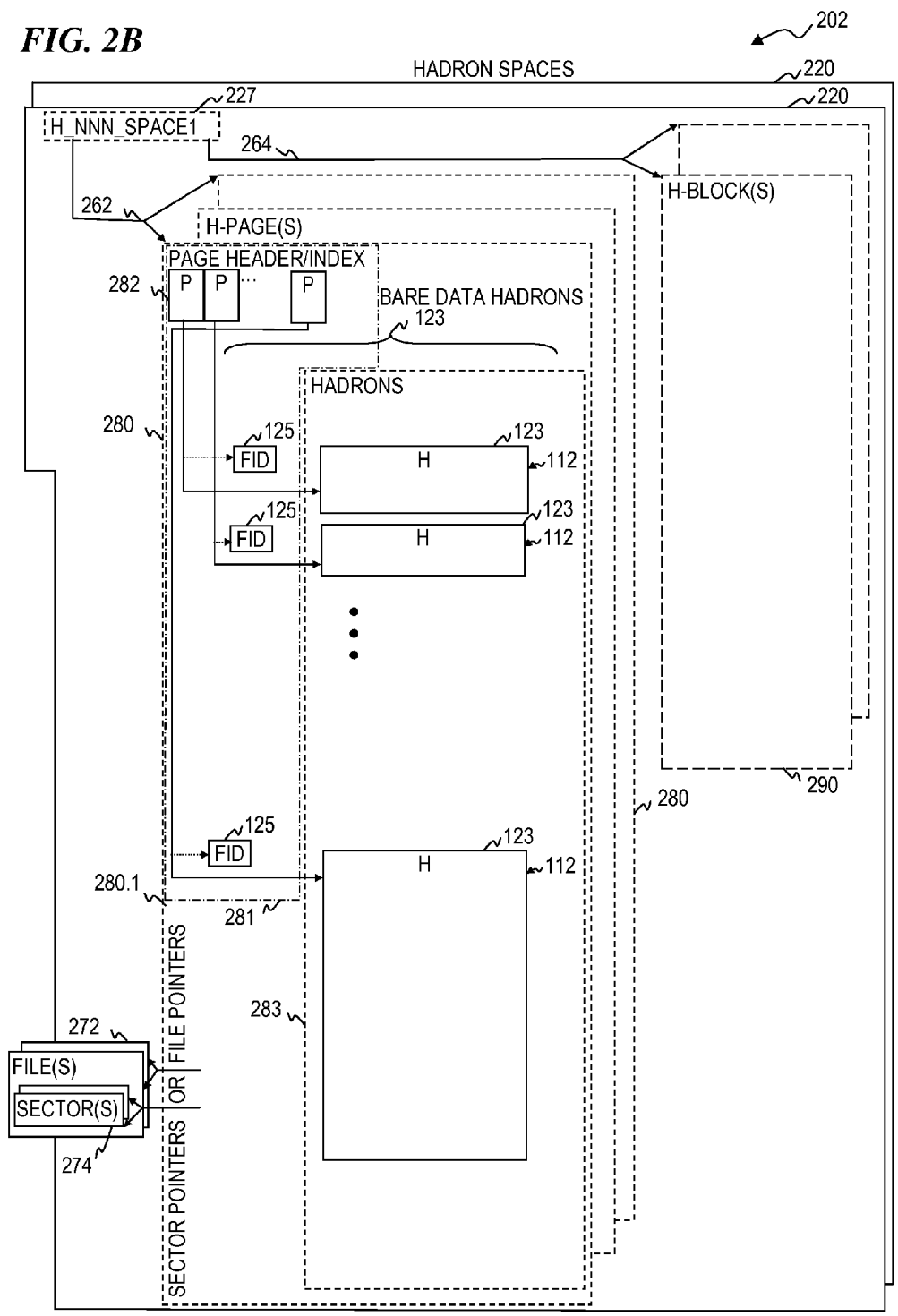

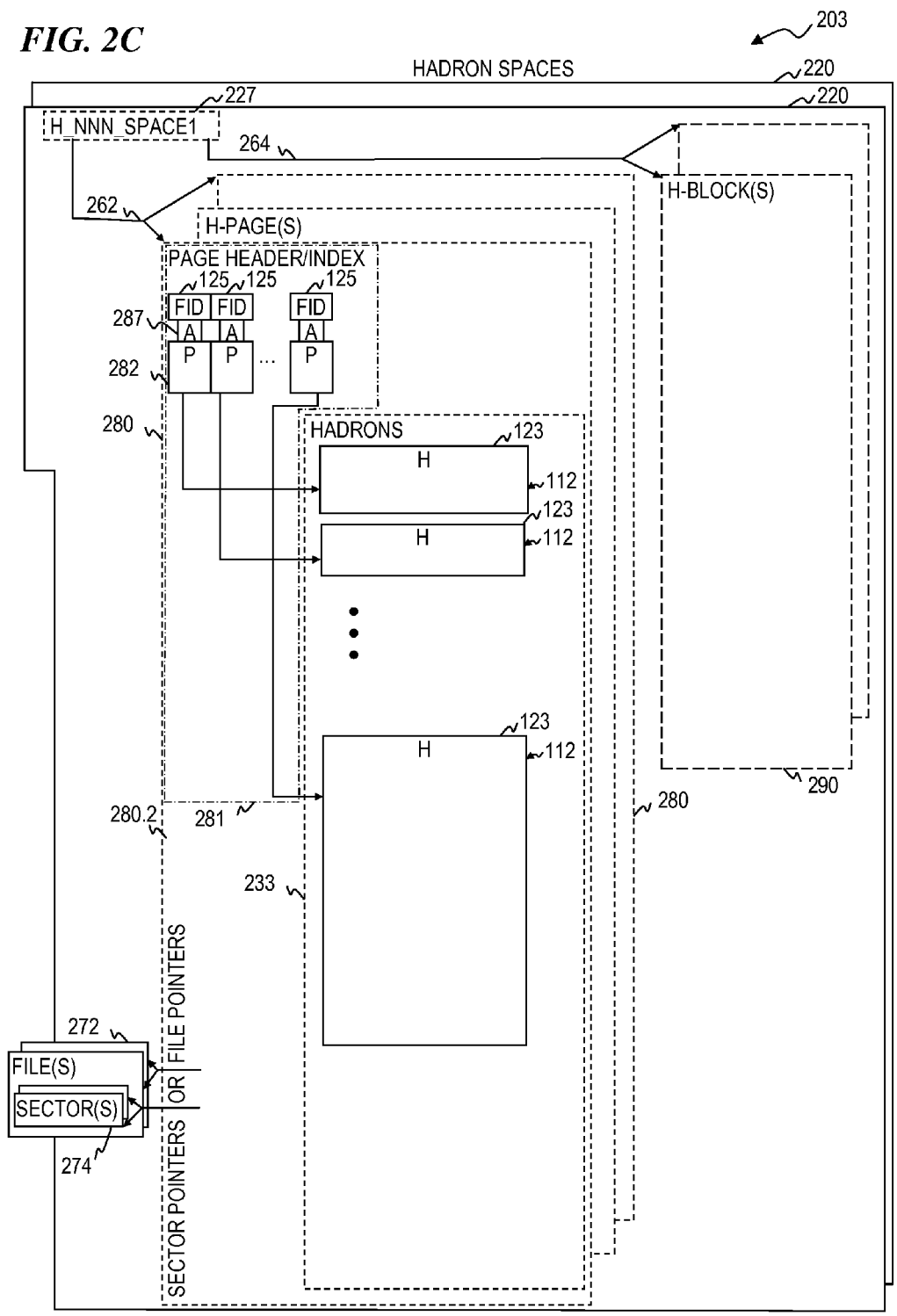

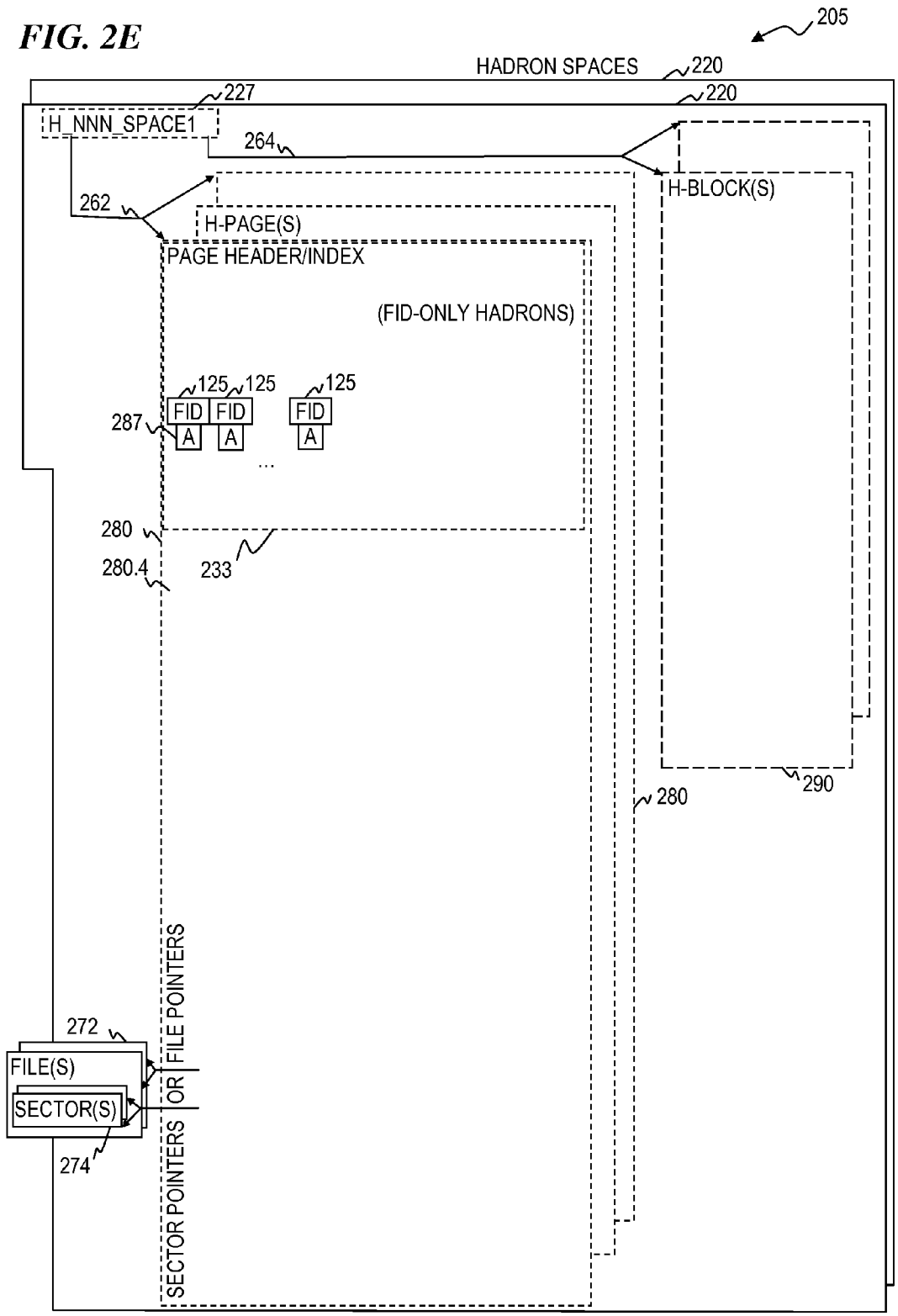

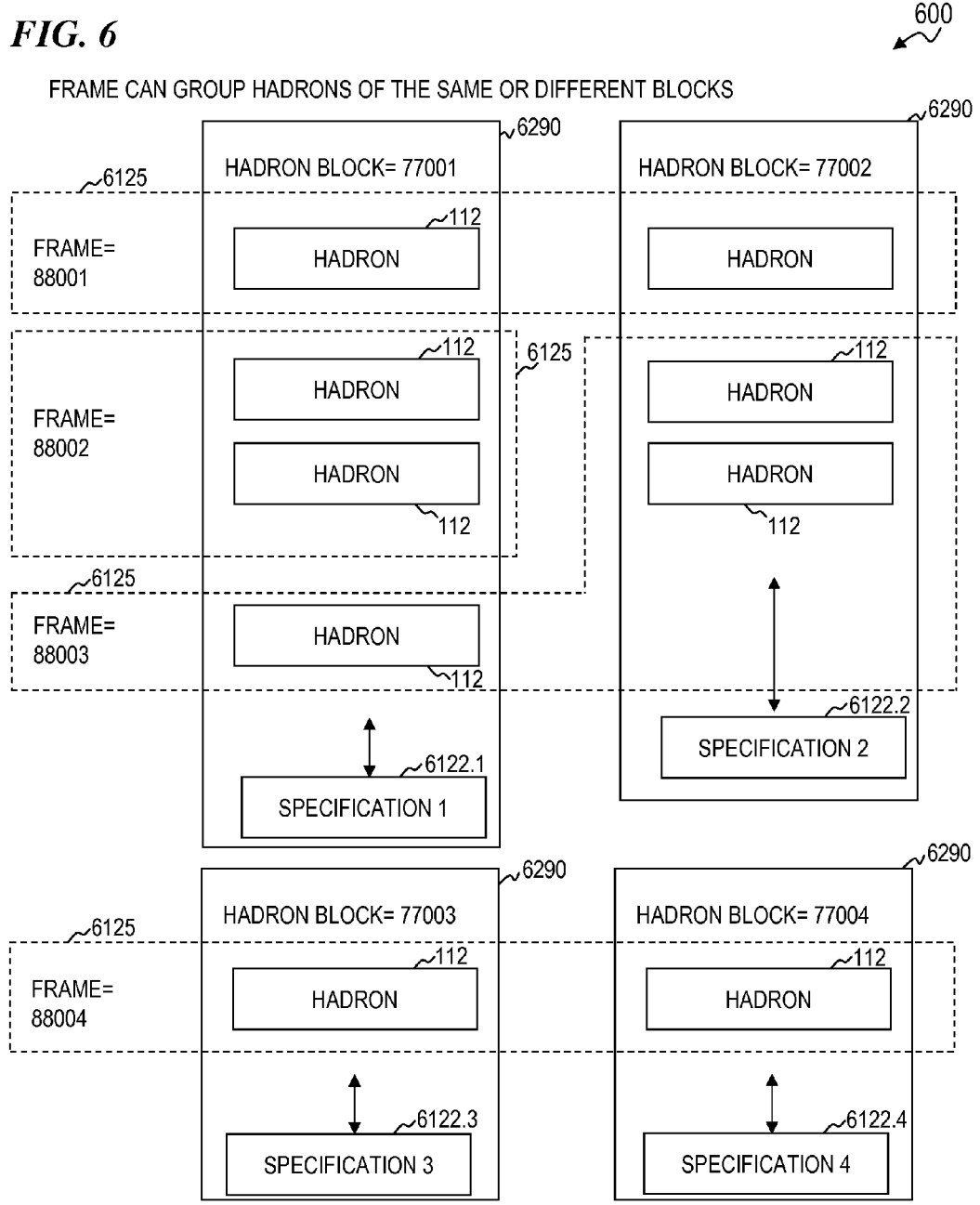

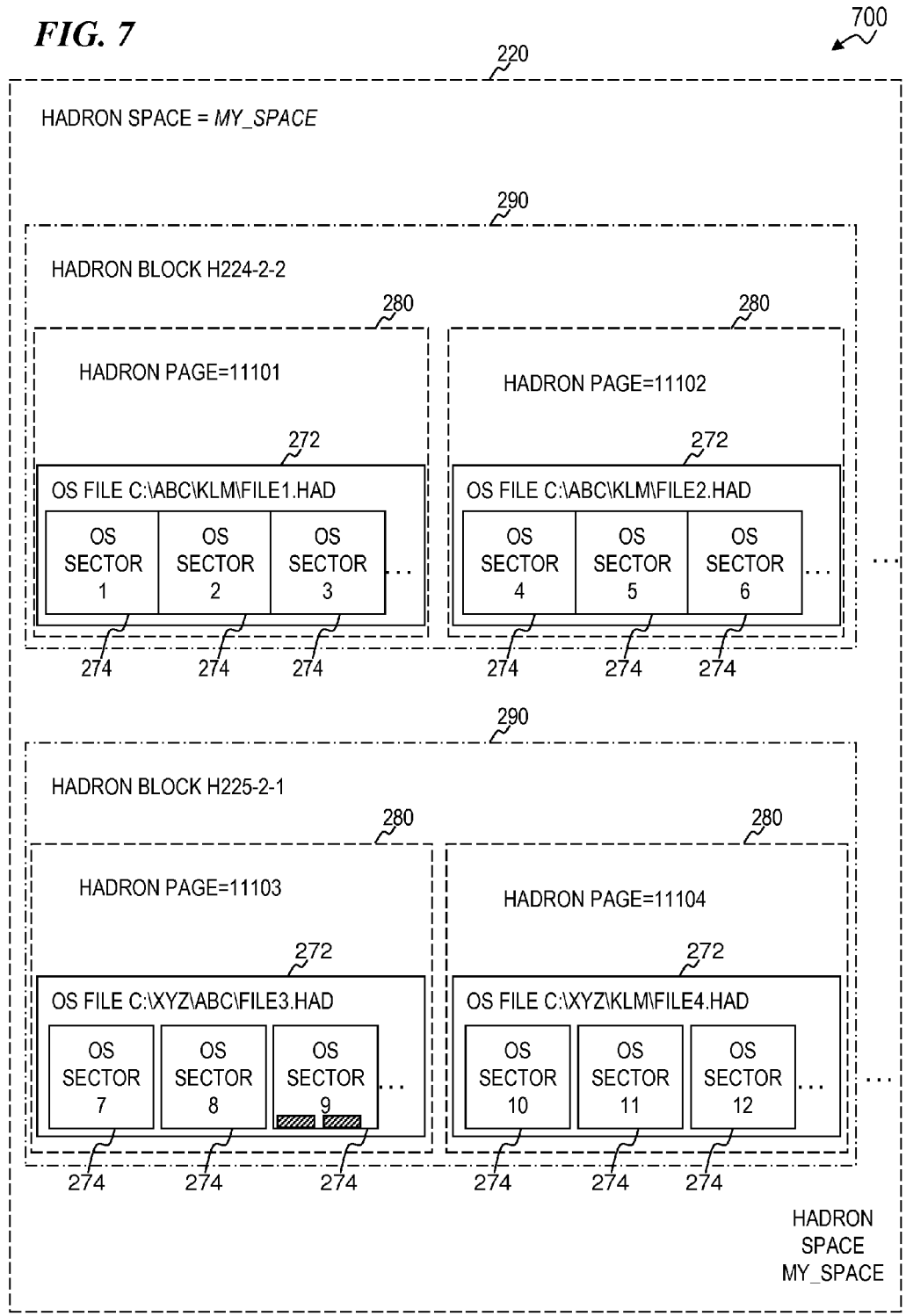

APPARATUS AND METHOD FOR ORGANIZING, STORING AND RETRIEVING DATA USING A UNIVERSAL VARIABLE-LENGTH DATA STRUCTURE

CROSS-REFERENCE TO RELATED APPLICATION

This application claims priority benefit under 35 U.S.C. §119(e) of U.S. Provisional Patent Application No. 61/490,559, filed May 26, 2011 and titled "Apparatus and method for organizing, storing and retrieving data using a universal variable-length data structure", and U.S. Provisional Patent Application No. 61/564,300, filed Nov. 28, 2011 and titled "Apparatus and method for organizing, storing and retrieving data using a universal variable-length data structure", which are both incorporated herein by reference in their entirety.

FIELD OF THE INVENTION

This invention relates to the field of computer storage, and more specifically to a method and apparatus of uniformly organizing data into easily organizable and retrievable data structures that have the capability to be stored and retrieved using a universal variable-length data-structure architecture, as contrasted to block storage used by conventional operating systems and computer-storage devices such as disk drives or FLASH memory devices.

BACKGROUND OF THE INVENTION

In conventional usage, a hadron is a nuclear-physics term introduced by nuclear physicist Lev B. Okun in 1962. In particle physics a hadron is a composite particle made of quarks. The present invention, in contrast, uses the term "hadron" in a different context, namely, to refer to a specific data structure and its architecture for data storage.

Data storage is at a seemingly impassable crossroads: more than ever before, applications are dependant on performance, protection and availability of data; at the same time the diversity of data sets, infrastructures and topologies create an endless array of configurations for those applications to connect with. Attempts to solve this problem have forced different applications to adhere to different proprietary data structures making interfaces to data storage more and more complex, while trying not to compromise application functionality. Complicating matters further, the very dynamic nature of contemporary data requirements asks for considerable investment, maintenance and support of already implemented data structures. This results in a difficult choice: one could chose to fight the "windmill" of proprietary data structures and suffer the limitations of current storage capabilities; or one could chose to use accepted storage back-end standards and face additional work to address a "one-size-fits-all" challenge.

The entity-attribute-value model (EAV) is a data model to describe entities where the number of attributes (properties, parameters) that can be used to describe them is potentially vast, but the number that will actually apply to a given entity is relatively modest. In mathematics, this model is known as a sparse matrix. EAV is also known as an object-attribute-value model, vertical database model, and open schema.

U.S. Pat. No. 7,016,900 was filed Jun. 29, 2001, issued to Boris Gelfand on Mar. 21, 2006, and is titled "Data cells and data cell generations," U.S. Pat. No. 7,822,784 is a divisional of U.S. Pat. No. 7,016,900, and both are incorporated herein by reference. U.S. Pat. No. 7,016,900 described an OEAV data model with data cells containing an entity identifier ("O"), an entity type ("E") an attribute type ("A"), and an attribute value ("V"). Cells with identical O and E values constitute a cell set. Pairs of synapse cells relate cell sets, each synapse cell having O and E values of one cell set and A and V values equal to the E and O values of the other cell set. Cell generations store information about attributes, entities, relationships, constraints, and default data formats in the same cell listing as the cells containing the actual real-world data. Thus, data in a data cell can be considered self-identifying. Gelfand also described a way to normalize data using data pool cell sets. The data cells themselves can be stored in multiple, co-existing storage trees that are specialized for increased data query efficiency.

U.S. Pat. No. 7,200,600 was also filed Jun. 29, 2001, issued to Gelfand on Apr. 3, 2007, and is titled "Data cells, and a system and method for accessing data in a data cell," U.S. Pat. No. 7,783,675 is a divisional of U.S. Pat. No. 7,200,600, and both are incorporated herein by reference. Gelfand described a method and system for storing data in data cells containing only a single element of data. Here again, each data cell includes four components: "O," "E," "A," and "V". Every cell contained a unique combination of O, E, A, and V. Relationships between cell sets were established by creating two synapse cells. The first synapse cell has O and E values of the first cell and has A and V values equal to the E and O value, respectively, of the second cell. The second synapse cell, has O and E values of the second cell, and has as its A and V values the E and O value, respectively, of the first cell set. U.S. Pat. Nos. 7,016,900 and 7,200,600 claimed priority to U.S. Provisional Patent Application 60/215,447 filed on Jun. 30, 2000, which is incorporated herein by reference.

The OEAV data model defined by U.S. Pat. Nos. 7,016,900, 7,200,600, 7,783,675, 7,822,784 has the following deficiencies:

1. The OEAV data model is restricted to an entity-attribute (E-A) definition format. The cell-set can only embrace cells which belong to one and only one E. Real-life data does not follow this format.
2. The so-called cell-generations imply the generation hierarchy that does not allow having one dataset include a definition of another dataset as data, which can restrict, and make difficult, its use for most complicated data structures other than a tabular format.
3. The so-called values pool is presented as a regular set of tables, which impairs the system implementation and, in fact, may negate some of the efficiencies of the system.
4. So-called synopses between cell-sets are two-way links, which can create more links cells than data cells and slow the system. Example: One company has 1000 employees. Each employee has one link to the department, but the company has 1000 links to employees.
5. Since the table record is disassembled into cells, reassembly of the record can be slow.
6. It is not possible to address the relationship between a cell-set and a cell without creating another, segregated, cell-set, containing one cell only with back-links, which slows system performance.
7. As it relates to Sybase—IQ, Vertica, Illuminate Solutions and Entity-attribute-value model (EAV), these conventional products use a columnar representation of the relational model. Every column is implemented usually in a form of B–Tree or B+Tree indices. The products are implemented for SQL-based front-end products and have not deviated from a relational model. In fact, all the metadata is stored in conventional data tables. The products do not store and maintain any other structures except relational tables.

The following overview of disk topology and disk operations is very general and serves only one purpose: i.e., explanation of how hadron data storage works with conventional disk technology. Any information on computer disk is stored in disk blocks (sectors), which are the units in which data is stored and retrieved on a fixed-block architecture disk. Disk blocks are of fixed usable size and are often numbered consecutively using disk block numbers. Generally, each disk block (sector) has the same size: 512 eight-bit words. Lately (starting about 2011), all major hard disk drive manufacturers began releasing hard disk drive platforms using the "Advanced Format" of 4096-byte logical blocks and stronger error correction.

When the operation system is installed on a computer with raw disks or when a new raw hard disk is connected to a computer, the process of disk formatting is to be executed. Disk formatting is the process of preparing a hard disk drive for data storage. The final result of disk formatting is a map, which is basically a list of blocks with logical block address (LBA), which typically is simply a number between 0 and N−1, where N is the total number of blocks in that disk drive. In the computer that uses a disk drive to store and retrieve data, the operating system uses a file system that provides a directory of files, file names and the associated LBAs, and other metadata. Typical operating systems use dynamic allocation, which allocates space (adds or subtracts LBAs) to a file in portions as needed.

Some shortcomings of the above-described background information are presented below. What are needed are a better data-storage model, architecture, query language and implementation.

SUMMARY OF THE INVENTION

The present invention fits into an overall architecture, data structures and associated query language, as well as software, hardware, and/or firmware devices that use easily organizable and retrievable data structures that can be stored and retrieved using a universal variable-length data structure as contrasted to block storage used by conventional computer storage devices (termed "system storage" herein) such as disk drives or FLASH memory devices.

In some embodiments, a method and apparatus that implement a "hadron" data structure architecture are used. Software to control and manage hadrons is called the hadron system, and in some embodiments, the hadron system uses the computer's operating system to store data into files (e.g., stored to the system storage such as a disk drive or other non-volatile storage) and later retrieve the files. In some embodiments, each hadron includes a hadron frame identifier (FID), and a hadron data holder (H) (which can be considered as the payload). In some embodiments, an optional hadron identifier (HID) is also associated with each hadron. A plurality of hadron blocks are used, each block defining a hadron specification for data (and/or a specification for metadata describing other data). A plurality of hadron frames are provided, wherein the each frame is associated with (or, in some embodiments, identical to) its FID, and wherein one or more frames is/are associated with each dataset as the dataset is defined and loaded with data. The dataset is also associated with one or more blocks, wherein each block provides the hadron specification for one or more hadrons (note that typically a single block provides the hadron specification for very many hadrons, and thus the hadron specification used by each hadron is not stored separately for each hadron, but rather a single hadron specification is typically used for very many hadrons. In some embodiments, a plurality of hadron pages is provided. In some embodiments, each hadron page contains a header, which contains an index of where each hadron data holder in the page is, and each hadron data holder in the page is associated with its FID. In some embodiments, each page is associated with one or more files (or the sectors associated with those files) into which the contents of the page are stored when the hadrons are to be stored to the system storage (e.g., disk drive(s)), and from which the page's data are retrieved when the hadrons are to be fetched from the system storage.

In some embodiments, the hadron system uses a plurality of hadron spaces. In some embodiments, the hadron system is created in one or more hadron spaces (these are sometimes called hadron system spaces), and the data for each user is held in one or more hadron spaces (these are sometimes called hadron user spaces). Each hadron space contains pointers to (or is otherwise associated with): one or more files (conventional files handled by the computer's operating system for storing data to, and fetching data from, the computer's system storage) and/or the sectors used to hold the data for the files; one or more hadron pages, one or more hadron frames, one or more hadron blocks, and optional other metadata.

In some embodiments, the invention includes creating a plurality of hadrons including first, second and third hadrons; creating a first hadron frame having a frame identifier; altering the first hadron frame to associate the first plurality of hadrons with the first hadron frame; and dropping the second hadron without dropping the first or the third hadrons. Some embodiments further include dropping the first hadron frame and those remaining ones of the first plurality of hadrons that are then associated with the first hadron frame. In some embodiments, the dropping of the at least one of the first plurality of hadrons includes deleting all data associated with all of the at least one hadron data structure. In some embodiments, at least a portion of a hadron specification for the payload of data in the holder of the first hadron data structure is held in core meta syntax (CMX) of the hadron data structure architecture, and wherein the hadron specification pointer of the first hadron data structure includes an identifier of specification metadata in the CMX.

Some embodiments include a method and apparatus for implementing a "hadron" data structure architecture. In some embodiments, each hadron includes a frame identifier and a holder for a payload of data, wherein a plurality of hadrons are stored in a hadron block that provides a specification that includes metadata that specifies the payloads. Some embodiments include a plurality of hadron blocks first and second hadron data blocks, each block including one or more hadron pages. Upon receiving data particles of a dataset, the system forms a first plurality of hadron data structures (hadrons) by creating a first frame identifier and associating the first frame identifier with a first data particle to form the first hadron, and creating a second frame identifier and associating the second frame identifier with a second data particle to form the second hadron, and stores the first plurality of hadron data structures in the first hadron page. In some embodiments, the present invention also provides a first lookup function between the frame identifiers and the data particles in the first hadron block that provides all the data particles, if any, in the first hadron block that match an input frame identifier value, and a second lookup function between the data particles and the frame identifiers in the first hadron block that provides all the frame identifiers, if any, in the first hadron block that match an input data particle value.

Some advantages of the present invention include:

(1) Rather than storing a data element in a four-piece construct (e.g., REC-ID, ENTITY-ID, ATTRIBUTE-ID, VALUE such as used in the prior-art OEAV model described in U.S. Pat. Nos. 7,016,900 and 7,200,600 set forth above), some embodiments of the present invention use a "hadron" having two components (a hadron frame identifier "FID" and a holder "H") along with an implied hadron specification identifier "S" that describes the information in the holder component of each of one or more hadrons.

(2) Rather than addressing an Entity-Attribute pair used by the OEAV model, some embodiments of the present invention define the hadron specification identifier "S"—one single focus number, which has the capability to represent any kind of specification including hadron specifications from a plurality of different datasets when necessary. This immediately allows the programmer and system to store data having any kind of data structure, e.g., lists, trees, matrices, graphs, etc., in the hadrons of the present invention.

(3) Rather than grouping data values by either record id REC-ID or O used by the OEAV model (which is actually equivalent to REC-ID), some embodiments of the present invention group data hadrons by hadron frame (each hadron frame being identified by a frame identifier "FID"), without any topological restriction, which in turn allows the programmer and system to create unrestricted combinations of hadrons, thus supporting unrestricted data structures.

(4) Rather than making identifications on column (cell) level, as used by the OEAV model, some embodiments of the present invention provide a unique identification of each hadron (the hadron identifier "I"). The unique identification of each hadron (the hadron identifier "I") allows the programmer and system to create references on the hadron level, which again supports the ability to store data of any data structure.

(5) Rather than trying to find a method of data-type identification of the V part of the data cell of the OEAV model, some embodiments of the present invention include the data type into the hadron specification identifier "S" component associated with the hadron.

(6) Rather than not addressing the physical implementation of data partitioning, the present invention provides a very clear method of data partitioning by including the blocking factor into the present design. This factor facilitates parallelism and, therefore, provides the solution for the "reassembly" problem.

BRIEF DESCRIPTION OF THE DRAWINGS

Please note that in the attached Figures, the numbers in Time Roman Bold font and inside boxes are example numbers and/or indices for exemplary embodiments of the present invention (these are not reference numbers), while those numbers in Arial Narrow font in the attached Figures are reference numerals for elements described in the text herein.

FIG. 2B is a schematic representation of a set 202 of hadron spaces 220, at least some of which use a first format 280.1 of a page 280 used in some embodiments of the present invention.

FIG. 2C is a schematic representation of a set 203 of hadron spaces 220, at least some of which use a second format 280.2 of page 280 used in some embodiments of the present invention.

FIG. 2E is a schematic representation of a set 205 of hadron spaces 220, at least some of which use a fourth format 280.4 of page 280 used in some embodiments of the present invention.

FIG. 6 is a schematic representation of certain relationships 600 of hadron frames, hadron blocks, and hadrons according to some embodiments of the present invention.

FIG. 7 is a schematic representation of certain relationships 700 of hadron frames, hadron blocks, and hadron pages, and operating-system sectors and files according to some embodiments of the present invention.

DESCRIPTION OF PREFERRED EMBODIMENTS

Figure 1A:
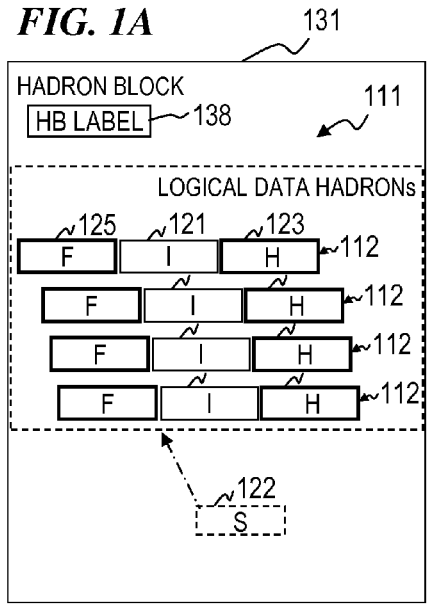
FIG. 1A is a schematic representation of the basic structure of a complete data hadron (often, simply called complete hadron) 111.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon, the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Fundamentally, a hadron of the present invention, which is described in detail near below, is capable of storing any kind of data (e.g., a single data element, a list of data elements, a hierarchical tree of data, a graph, a data object, etc.), and is capable of accommodating any possible future data structures, stored on any current and future computer data-storage media. The hadron data model allows programmers to easily organize and access data in a comprehensive manner with a single architecture. In some embodiments, the present invention fits into the architecture (the hadron-data-structure architecture) having a plurality of data-storage commands, and the method using those commands, wherein the method includes providing a hadron-data-structure-architecture definition.

Each hadron data structure (this data structure is called a hadron) has a frame identifier component (FID) and a holder component (H) that includes a "payload" of data. A dataset is defined and data is put into the dataset, wherein each dataset is associated with one or more frames (F). In some embodiments, the FID and its frame (F) are synonymous (i.e., in some embodiments, they are one and the same). One or more hadrons are stored on each hadron page. Each hadron is associated with a hadron specification component (S) that is stored in a hadron block, wherein the hadron specification component S includes metadata specifying the data type and characteristics of the payload in the holder component H of all the hadrons held in (or directly associated with) the block (such that the specification is not. Optionally, a unique hadron identifier (HID, sometimes also simply called the identifier (I)) is associated with each hadronNote that, a single hadron specification is typically shared among many hadrons (each of which uses the same hadron specification), and that the unique hadron identifier (I) is optional, such that each hadron need only store its F and H parts. In some embodiments, a plurality of F H pairs is stored on each of a plurality of hadron pages. In some embodiments, where all of the holder portions within a hadron page have the same identical F identifier, the FID portion is stored only once in the page, and is implicitly part of every hadron having a holder that is in that page. In some embodiments, where all of the holder portions within a hadron page have the same identical holder, the holder portion is stored only once in the page, and is implicitly part of every hadron having a FID that is in that page. In some embodiments, where all of the holder portions within a hadron page have the same identical holder and the holder can be deduced (e.g., by the frame not being in a page having an opposite holder value), the holder portion is not stored even once in the page, and is implicitly part of every hadron having a FID that is not on another hadron page (e.g., if there are only two values permitted for one value assigned to all hadron frames in a dataset (e.g., current employee, or not current employee)), then all members of the dataset having an FID that is not found in the pages holding the FIDs with the holder value "current employee" are implied to have a FID with the holder value "not current employee" and thus the pages having the FIDs of those "not current employee" members of the dataset need not even store the holder value "not current employee."

In some embodiments, a method and apparatus that implement a "hadron" data structure architecture are used. Software to control and manage hadrons is called the hadron system, and in some embodiments, the hadron system uses the computer's operating system to store data into files (e.g., stored to the system storage such as a disk drive or other non-volatile storage) and later retrieve the files. In some embodiments, each hadron includes a hadron frame identifier (FID), and a hadron data holder (H) (which can be considered as the payload). In some embodiments, an optional hadron identifier (HID) is also associated with each hadron. A plurality of hadron blocks are used, each block defining a hadron specification for data (and/or a hadron specification for metadata describing other data). A plurality of hadron frames are provided, wherein the each hadron frame is associated with its FID, and wherein one or more hadron frames is/are associated with each dataset as the dataset is defined and loaded with data. The dataset is also associated with one or more blocks, wherein each block provides the hadron specification for one or more hadrons (note that typically a single block provides the hadron specification for very many hadrons, and thus the hadron specification used by each hadron is not stored separately for each hadron, but rather a single hadron specification is typically used for very many hadrons. In some embodiments, a plurality of hadron pages is provided. In some embodiments, each hadron page contains a header, which contains an index of where each hadron data holder in the page is, and each hadron data holder in the page is associated with its FID. In some embodiments, each page is associated with one or more files (or the sectors associated with those files) into which the contents of the page are stored when the hadrons are to be stored to the system storage (e.g., disk drive(s)), and from which the page's data are retrieved when the hadrons are to be fetched from the system storage.

In some embodiments, the hadron system uses a plurality of hadron spaces. In some embodiments, the hadron system is created in one or more hadron spaces (sometimes called hadron system spaces), and the data for each user is held in one or more hadron spaces (sometimes called hadron user spaces). Each hadron space contains pointers to (or is otherwise associated with): one or more files (conventional files handled by the computer's operating system for storing data to, and fetching data from, the computer's system storage) and/or the sectors used to hold the data for the files; one or more hadron pages, one or more hadron frames, one or more hadron blocks, and optional other metadata.

FIG. 1A is a schematic representation of the basic structure of a complete virtual hadron 111 within a particular hadron block 131 (which has a hadron-block label 138), according to some embodiments of the present invention. A complete virtual hadron 111 is way of visualizing a universal data particle that has four component elements that are associated with one another but not usually stored all together in one place and all elements of the complete virtual hadron 111 are not replicated for every such hadron:

F component (reference 125 in FIG. 1A, the hadron Frame component, which is also called FID, which stands for Frame IDentifier component). Every hadron 111 is associated with a hadron frame identifier 121, which is an integer in some embodiments, and which is contained in the hadron 111's I component 121.

I component (reference 121 in FIG. 1A), which stands for Identifier component (which is also called the hadron Identifier component). Every hadron 111 optionally has a unique hadron Identifier 121, which is an integer in some embodiments, and which is contained in the hadron 111's I component 121.

S component (reference 122 in FIG. 1A) stands for hadron Specification component (also called Holder Specification component). The hadron specification S component 122 specifies the data type and characteristics of the content of the holder H component (see just below). In some embodiments, the value in the hadron specification S component 122 is an integer that identifies a hadron block 290, which is described further, below. Rather than storing a separate specification S component 122 for each virtual hadron 111, the present invention provides a mechanism to associate a single specification with a plurality of hadrons to which that specification S 122 applies. In some embodiments, the S component is associated with the hadron by placing a plurality of short hadrons 112 or bare hadrons 113 in a hadron page 280 (described below), wherein the hadron block 290 is associated with one or more such page 280 and provides the hadron specification (S component) that is used by, or applies to, all the hadrons 112 or 113 in the hadron page 280.

H component (reference 123 in FIG. 1A) stands for Holder component (which is also called a hadron Holder component or Data Element Holder component), which holds a data element (the content or payload within the holder). The data element stored in holder H component 123 may be of any data type, such as number (e.g., integer, floating point and the like), character string, date, time, BLOB (binary large object), CLOB (character large object), image, video, sound, etc. Note that a separate hadron specification (S) 122 is not provided for, or stored with, every hadron, but instead, when a dataset is defined, a plurality of hadron specifications 122 are associated with the dataset and implicitly connected to the hadrons of that dataset.

This hadron data-storage structure is similar to other things seen in science everyday—particularly in the fundamental principles of chemistry and physics. In chemistry and physics, there are a limited number of elements that are combined in various amounts and structures to create new materials. Each material may be unique, but the types of elements available to create the new material are fixed. Like in chemistry and physics, each virtual hadron 111 of the present invention is unique, like a new material, and is comprised of standard elements (i.e., the F 125, I 121, and H 123 components), which may be compared to quarks of nuclear physics, in that they are tightly bound to one another and not generally seen in isolation, and a separate S 122. As with chemistry and physics, virtual hadrons 111 are capable of being combined to create new, more complex structures.

With regard to the reference numbers appearing in FIG. 1A and the other following figures, hereafter below: When hadrons and their components are discussed in a general manner, the reference number 111 will be outside the box representing the virtual hadron and will have a leader line to the box being referenced, and the text will refer to "virtual hadron 111". When a hadron's identifier I component is discussed in a general manner, the text will refer to "hadron ID 121," "identifier 121," "I component 121," or a related variation. When a virtual hadron's hadron specification S component is discussed in a general manner, the text will refer to "hadron specification ID 122," "S component 122," "S122" or a variation. When a virtual hadron's holder H component is discussed in a general manner, the reference "holder 123," "H component 123," "S 122" or a related variation, will be used. In contrast, when a specific value (i.e., an example number representing the content of the component) of a hadron's I component, S component, or H component is discussed, equation expressions such as "hadron identifier=932" or "I=932," "hadron specification=933" or "S=933," or "holder=934" or "H=934" may appear.

Figure 1B:
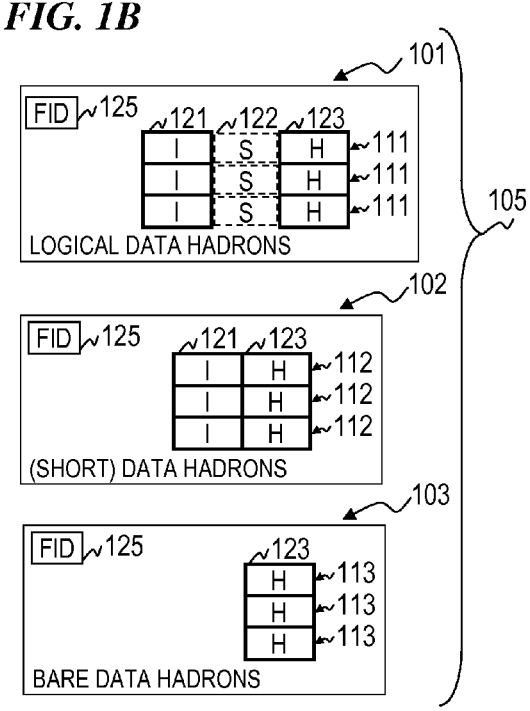
FIG. 1B is a schematic representation of a set 105 of three hadron data structure types (called "complete logical hadrons," "short hadrons" and "bare hadrons") some or all of which are used in some embodiments of the present invention.

FIG. 1B is a schematic representation of a set 105 of three hadron data structure types (called "complete virtual hadrons" 111 "short hadrons" 112 (also simply called "hadrons" 112) and "bare hadrons" 113) used in some embodiments of the present invention. When a dataset is loaded with data (e.g., using a "PUT DATA INTO my_dataset . . . ;" command), one or more hadron frames (identified by their FIDs 125) are created for that data (e.g., in some embodiments, each element or member of a LIST will have its own unique FID 125, while each RECORD of a TABLE will have its own unique FID 125 wherein that RECORD's FID 125 applies to all elements placed in the various FIELDs of that RECORD), and each hadron in the dataset is associated with one of the frames/FIDs 125 (i.e., each hadron contains or is associated with a FID 125), and one or more pages are allocated to hold and index to the hadrons. The uppermost portion of FIG. 1B illustrates three complete or "virtual" hadrons 111 (each of which has a unique hadron identifier 121, these "virtual" hadrons are diagrams that provide a mental aid for the human programmer to recognize the various parts and are not stored as such) from a dataset grouped into one hadron frame 101 with its Frame IDentifier (FID) (reference number 125 contains the single hadron frame identifier that is associated with each of these three virtual hadrons 111, which can have the same or different specifications 122 from hadron blocks that are associated with, but S 122 is not stored with or replicated for, every hadron), the middle portion of FIG. 1B illustrates three "short" hadrons 112 (each of which has a unique hadron identifier 121) from a dataset grouped into one hadron frame 102 with its single Frame Identifier (FID) (i.e., reference number 125 contains the single hadron frame identifier that is associated with these three short hadrons 112, which can have the same or different specifications 122 that are not shown here but which are associated with the hadrons via hadron blocks, which are described below), while the lowermost portion of FIG. 1B illustrates three "bare" hadrons 113 (none of which has a hadron identifier 121) from a dataset grouped into one bare-hadron frame 103 with its Frame Identifier (FID) (reference number 125). Note that the term "hadron" alone (without the modifiers "virtual" or "bare") generally refers to short hadrons 112 (each of which has a unique hadron identifier 121).

The structures called "complete virtual hadrons" 111 are shown as, and meant only to be, a mental aid to indicate that every hadron has a hadron specification associated with it that defines what is in the hadron and how it is organized. Short hadrons 112 that are used by the present invention differ from virtual hadrons 111 in that the short hadrons 112 have a hadron specification component that is provided implicitly, e.g., by being provided as an element of the hadron block 280 (see FIG. 2A below; in some embodiments, for example, the S component(s) of all the short hadrons in a particular dataset can be provided by another short hadron associated with, linked to, or embedded in the hadron block 290). Short hadrons 112 (often simply called "hadrons" 112 herein), each of which is associated with a unique hadron identifier 1121, are discussed further, below. In some embodiments, bare hadrons 113 (which omit the hadron identifier 1121) and bare-hadron frames 103 are not used, such that all data is held in hadrons 112 each having a hadron identifier 1121, and each being associated with hadron frames 102.

In some embodiments, every hadron 112 "belongs" to a hadron frame 102, and its FID 125 is stored in the hadron page (described below) used to hold that hadron 112. In some embodiments, the hadron system includes a plurality of indices that support various lookup functions, including, for example, an index that facilitates an FID-to-holder (F→H) lookup function that finds all holders having a given FID, and an index that facilitates a holder-to-FID (H→F) lookup function that finds all FIDs having a given holder. See FIG. 5A below, which describes examples of the functions of the present invention.

Figure 2A:
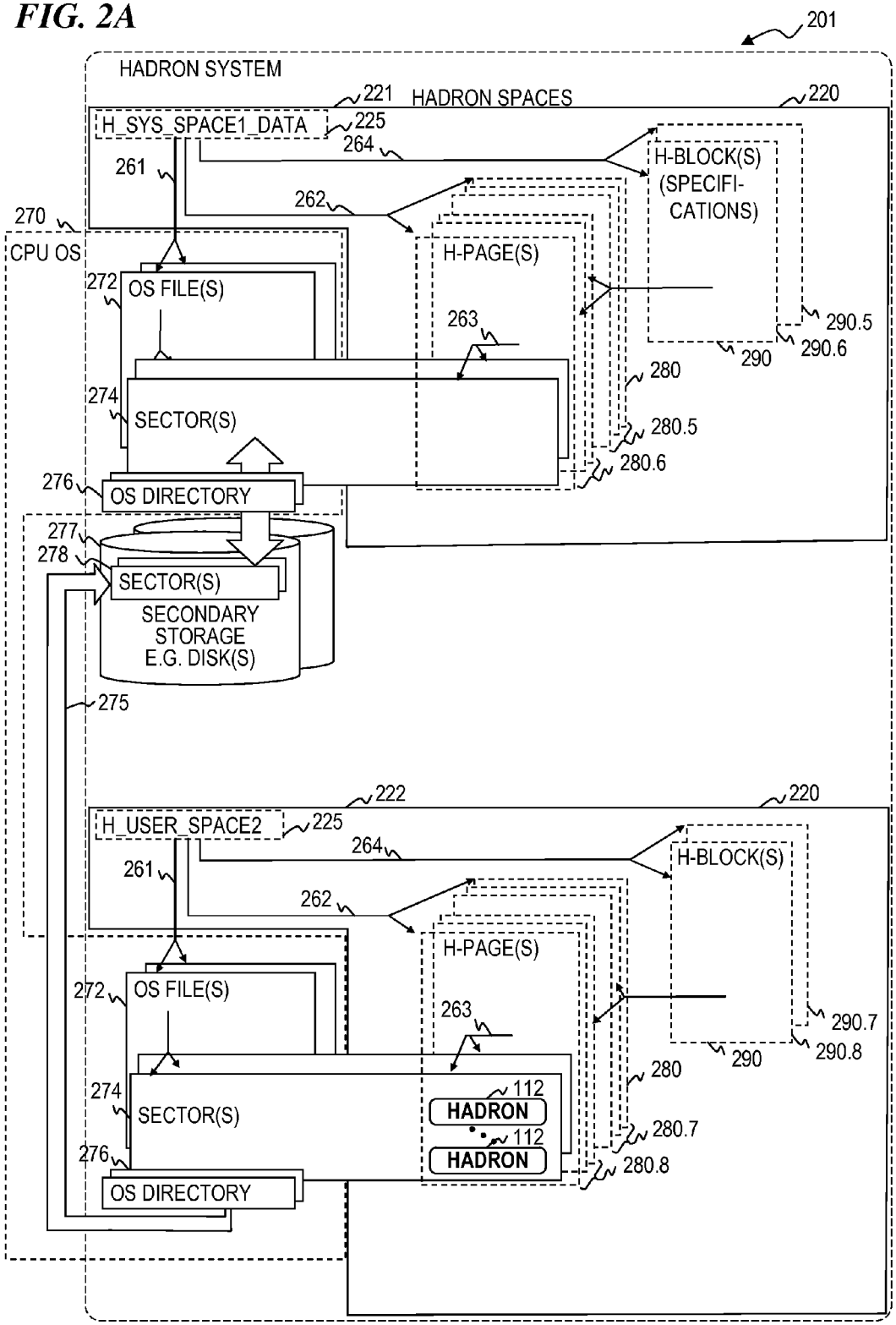
FIG. 2A is a schematic representation of a set 201 of hadron spaces 220.

When the hadron system of the present invention defines a dataset (e.g., using a "DEFINE DATASET my_dataset AS . . . ;" command), the hadron system creates one or more hadron frames (the FIDs of these frames are associated with the dataset itself). When the hadron system puts data into the dataset (e.g., using a "PUT DATA INTO my_dataset . . . ;" command), the hadron system creates one or more hadron frames 102 and one or more hadrons 112 and as soon as a hadron 112 is created, it is associated with one, and only one, hadron frame 102, and written into a hadron page that indexes between the FIDs 125 and holders 123 of the various hadrons 112 on that hadron page. Every hadron frame 102 has a unique Frame Identifier (called a FID—also, alternatively, hereafter, simply called F) 125. A hadron frame 102 may have one or more hadrons 112 (e.g., each element of a LIST has its own FID, while each record of a TABLE has its own FID that applies to every element or field of that record), as illustrated in FIG. 1B. Referring briefly to FIG. 2A, in some embodiments, each hadron block 290 includes one or more hadron pages 280 (wherein all hadrons on a given page have the same data type), so that a record in a table may have different data types for each field, wherein hadrons of each different data type are stored in a page of a different hadron block. Eeach hadron block provides the specification for one type of data, and all hadron pages of that hadron block store hadrons of the same data type, which is specified by the hadron block; thus a record that had one field that holds numbers (e.g., a birth year of a person) and another field that held strings (e.g., the name of the person) and another field that held JPG-type images (e.g., a photograph of the person), would have a single FID 125 (e.g., FID=3456) that applied to all fields of that record, wherein the numbers (e.g., the birth years of the persons) would be stored in a hadron page associated with a hadron block that specified numbers as its data type, wherein the strings (e.g., the names of the persons) would be stored in a hadron page associated with a hadron block that specified strings as its data type, and wherein the images (e.g., the photographs of the persons) would be stored in a hadron page associated with a hadron block that specified images as its data type.

Figure 1C:
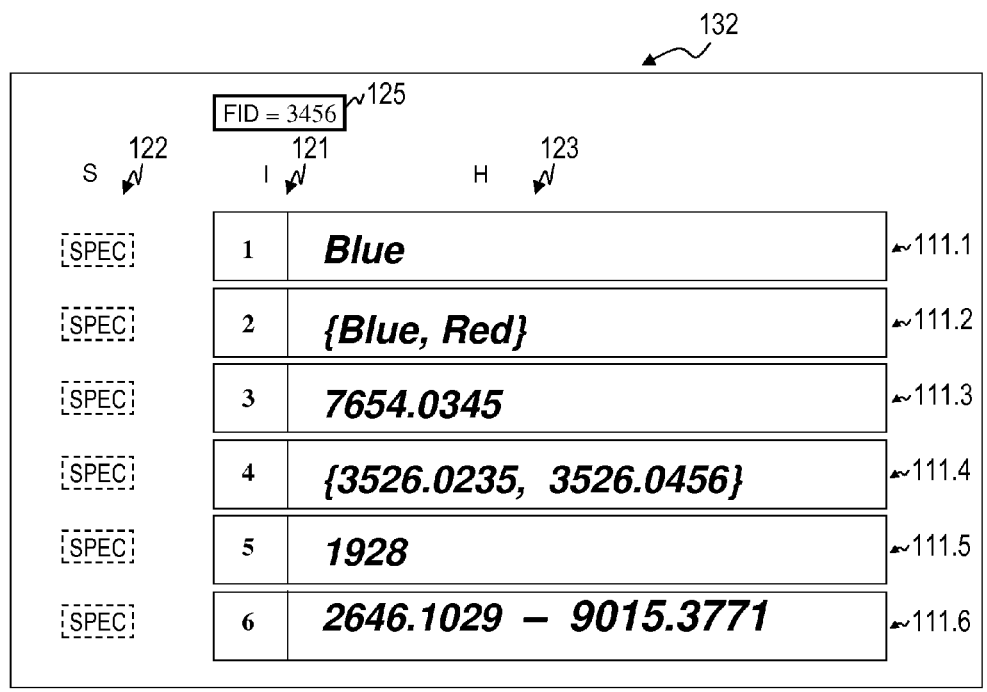
FIG. 1C is a schematic representation of a set 132 of data and metadata for a dataset used in some embodiments of the present invention.

FIG. 1C is a schematic representation of a set of some of the data and metadata for a data "particle" (which is organized into a hadron frame 132) of a dataset according to some embodiments of the present invention, where the dataset has a variety of different data types. In this example, one hadron frame 132 with its FID 125 (having FID="3456", which would apply to all elements of one RECORD of a TABLE), contains six hadrons, e.g., in this example, this single data particle is a RECORD in a TABLE contains the following:

The virtual hadron 111.1 having I=1 holds a string "Blue".

The virtual hadron 111.2 having I=2 holds a list set of two strings "{Blue, Red}".

* The virtual hadron 111.3 having I=3 holds a hadron Identifier I="0345" of a hadron frame having FID="7654" which together are represented as "7854.0345".

* The virtual hadron 111.4 having I=4 holds two hadron Identifiers of a hadron frame having FID="3526" as a list set "{0526.0235, 3526.0456}".

* The virtual hadron 111.5 having I=5 holds one hadron frame having FID="1928".

The virtual hadron 111.6 having I=6 holds a function that, in some embodiments when executed, will provide data elements that result from a subtraction operation on the Holdings (H) of two hadrons (hadrons having hadron identifier I components="1029" and "3771"), that belong to two different frames (frames having FIDs="2646" and "9015", respectively).

* The optional embodiment used for hadrons 3, 4, and 5 above involves D-Bonding, which is detailed below. The notion that this data particle (which includes all of the data in frame 132) having many different types of data that are grouped together and handled as a single entity by assigning a common FID 125 that applies to, and is associated with, all of the virtual hadrons 111 in the data particle, is one key advantage of the present invention.

Note that in FIG. 1C, the specification 122 of virtual hadron 111.1 would indicate that the holder 123 is a single string, the specification 122 of virtual hadron 111.2 would indicate that the holder 123 is a list of strings, the specification 122 of virtual hadron 111.3 would indicate that the holder 123 is the FID 125 and hadron identifier 121 of another hadron, the specification 122 of virtual hadron 111.4 would indicate that the holder 123 is a list of the FIDs 125 and hadron identifiers 121 of other hadrons, the specification 122 of virtual hadron 111.5 would indicate that the holder 123 is an integer (e.g., of a year portion of a date), and the specification 122 of virtual hadron 111.6 would indicate that the holder 123 is an arithmetical function that causes the subtraction of the hadron having FID=9015 and hadronID=3771 from the hadron having FID=2646 and hadronID=1029. As one can easily see, this architecture is both simple and powerful, and it facilitates fast look-up queries and efficient storage of data.

As used herein, the terms "the hadron having I=4" and the term "hadronID=4" are synonymous terms for a specific identified hadron; this applies generally, for all specific I values shown in the examples. As used herein, the terms "the hadron frame having FID=4" and the term "FID=4" are synonymous terms for a specific identified frame; this applies generally, for all specific FID values. The term "hadron 112" means any generic hadron having reference number 112 as shown in the Figures. The term "FID 125" means any generic hadron frame or FID having reference number 125 as shown in the Figures.

Hadrons 112 can hold data of many types, from the very basic types (e.g., number, string, or date), to any complicated types (e.g., tables of records that have elements that are lists, pointers, images or other data structures). The actual content specification of a holder H component 123 (which specifies what kind of data? what data type? what length?, etc.) is specified by the hadron specification S component 122, the content of which is an integer that, in some embodiments, is the identifier of a particular other block where the characterizing information (i.e., metadata specifying the data kind, data type, length, etc.) is located.

FIG. 2A is a schematic representation of a set 201 of hadron spaces 220. In some embodiments, the hadron system (i.e., the software that provides the data structures functionality of the present invention combined with the system-level data structures) provides one or more hadron system spaces 221 that contain the core meta syntax (CMX) data structures and functionality, and other data structures (e.g., indices) and functional software used by the hadron system. When a user needs one or more places to store and retrieve data, the hadron system creates one or more hadron user spaces 222 (in some embodiments, the hadron system can allow a plurality of users can share a single hadron user space 222). In some embodiments, each hadron space 220 (e.g., hadron system spaces 221 and hadron user spaces 222) includes a hadron space identifier 225, pointers 261 to one or more files 272, pointers 262 to one or more hadron pages 280, pointers 264 to one or more hadron blocks 290, and optionally other metadata for the hadron space 220. Note that each hadron system space 221 and each hadron user space 222 are all hadron spaces 220. In some embodiments, the restrictions enforced for accessing or modifying system hadron system spaces 221 are different (e.g., having higher security and locks) than those enforced for accessing or modifying system hadron user spaces 222. In some embodiments, a password-based security is used to prevent unauthorized accessing and/or modifying of any hadron spaces 220.

In some embodiments, each hadron page 280 holds one or more hadrons 112, all of which are associated with a single hadron specification 122 that is provided by a hadron block 290, such that a single hadron block (e.g., 290.5) associated with that page (and optionally one or more other pages, e.g., the set 280.5) has the specification for all hadrons in that page 280.5. In some embodiments, a first plurality of pages 280.5 would use the specification provided by hadron block 290.5, and a second plurality of pages 280.6 would use the specification provided by hadron block 290.6. Similarly, in hadron user space 222, a third plurality of pages 280.7 would all use the specification provided by hadron block 290.8, and a fourth plurality of pages 280.8 would all use the specification provided by hadron block 290.8.

FIG. 2B is a schematic representation of a set 202 of hadron spaces 220 that use a first hadron page format 280.1 of hadron page 280 used in some embodiments of the present invention. In some such embodiments, each page 280 having first hadron page format 280.1, has a header portion 281 that includes a plurality of hadron-page pointers P 282, each pointer 282 pointing to one holder H component 112 in that page. In some embodiments, the FID 125 for that holder H 112 is appended to the holder H component 112 at the beginning or end such that the pointer P 282 is used to point to both the FID 125 and H 112. In some embodiments, other bookkeeping data is also stored in the hadron page header 281, as described below.

In some embodiments, indexes or maps in the hadron spaces 221 and/or 222 are used as indices to index to a particular page and to one of the pointers P 282 to access the hadrons and FIDs on that page. In some embodiments, the hadron system includes a plurality of indices, for example, B+tree indices, including one F→H index that facilitates finding all holders that have a certain qualifying FID (the function would receive an input of a given FID, and would generate an output that had the zero or more holders that had that FID (i.e., if no holders had the input FID, a null result would be returned, while if one or more holders had the input FID, all of those holders would be returned)), and another H→F index that facilitates finding all FIDs that have a certain qualifying holder (the function would receive an input of a given holder value, and would generate an output that had the zero or more FIDs that had that holder (i.e., if no FID had the input holder, a null result would be returned, while if one or more FIDs had the input holder, all of those FIDs would be returned)).

FIG. 2C is a schematic representation of a set 203 of hadron spaces 220 that use a second format 280.2 of page 280 used in some embodiments of the present invention. In some such embodiments, each page 280 having second hadron page format 280.2, has a header portion 281 that includes a plurality of hadron-page pointers P 282, each pointer P 282 pointing to one holder H component 112 in that page, and each pointer P 282 having one or more associated allocated/availability bit A 287 (which, in some embodiments, indicates whether the hadron is already allocated (filled) or whether the space is available) and including the FID 125 in the structure holding the P 282 and A 287. Indexes or maps in the hadron spaces 221 and 222 are used as indices to index to a particular page and to one of the pointers P 282, FIDs 125 and allocated/availability bits A 287 to access the hadron on that page.

Figure 2D:
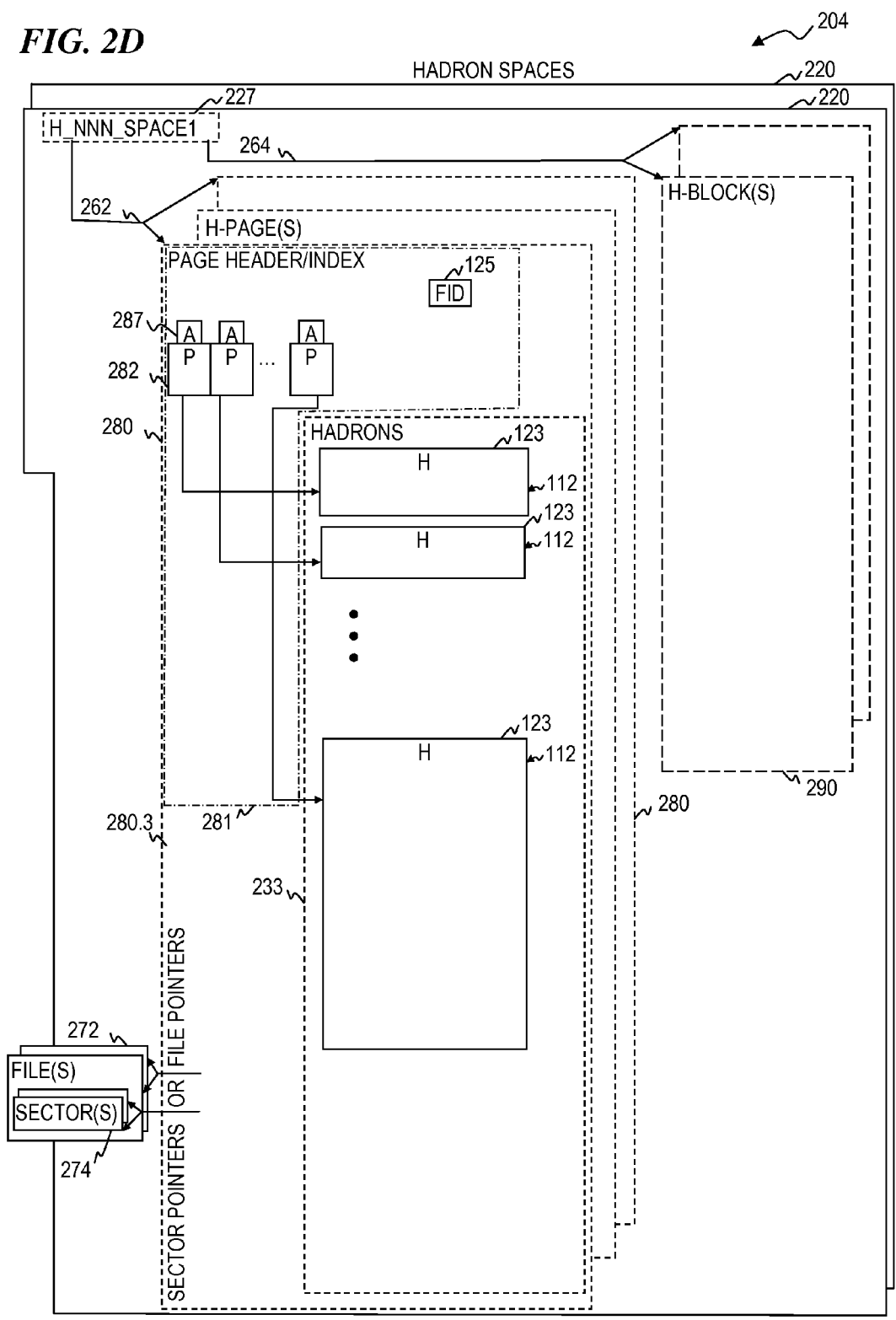
FIG. 2D is a schematic representation of a set 204 of hadron spaces 220, at least some of which use a third format 280.3 of page 280 used in some embodiments of the present invention.

FIG. 2D is a schematic representation of a set 204 of hadron spaces 220 that use a third format 280.3 of page 280 used in some embodiments of the present invention. In this format, all of the hadrons on the page have the same FID 125, so that the FID 125 is stored only once on the pages 280 having format 280.3, and that FID 125 applies to all the short hadrons 112 of that page 280. In some such embodiments, the H→F lookup function using the H→F index simply returns the single FID value if the qualifying holder is found on the hadron page 280, and the F→H lookup function using the F→H index simply returns all allocated hadrons' holder values if the qualifying FID is the one FID 125 on this hadron page 280.

FIG. 2E is a schematic representation of a set 205 of hadron spaces 220 that use a third format 280.4 of page 280 used in some embodiments of the present invention. In this format, all of the hadrons on the page have the same holder 123 (which has a value that in some embodiments, may be specified on the page, while in other embodiments, the value is implied as being a value or the opposite of a value found on other pages), so that the holder 123 is not stored (or stored only once) on the pages 280 having format 280.4, and that holder 123 applies to all the short hadrons 112 of that page 280. In some embodiments, a plurality of FIDs 125 are stored, one for each hadron 112. In some such embodiments, the H→F lookup function using the H→F index simply returns all allocated hadrons' FIDs values if any FID is found on the hadron page 280, and the F→H lookup function using the F→H index simply returns the single holder value (or a null if the holder is implied) if the qualifying FID is any of the FIDs 125 on this hadron page 280.

Figure 3A:
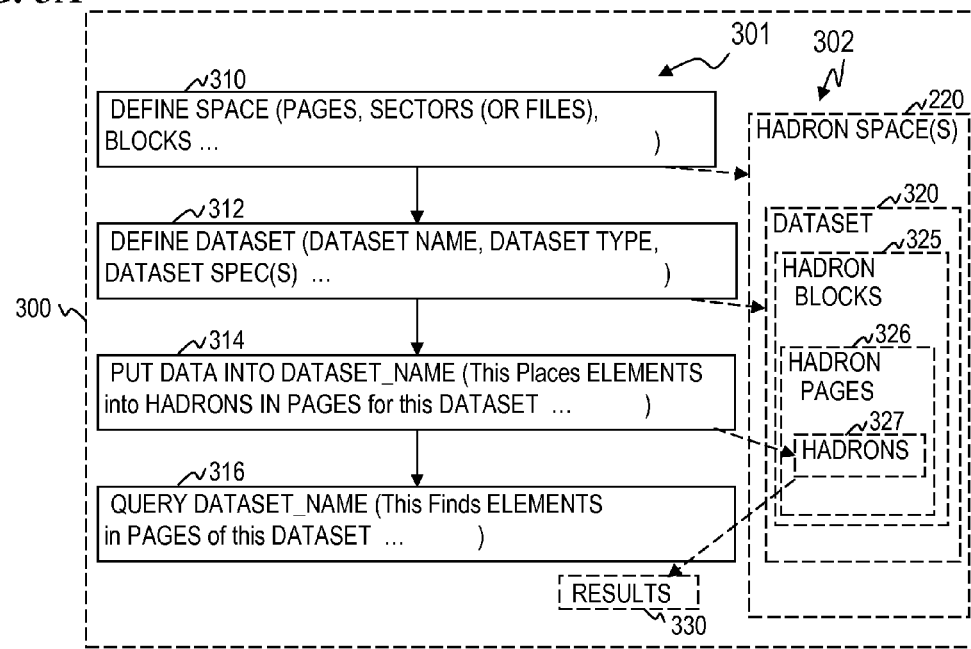
FIG. 3A is a flowchart 301 of the creation of a hadron space, definition of a dataset, putting data for the dataset into hadrons, and querying the dataset, according to some embodiments of the present invention.

FIG. 3A is a flowchart 301 of the creation of a hadron space, definition of a dataset, and putting data for the dataset into hadrons according to some embodiments of the hadron system 300 of the present invention. In some embodiments, the define space function 310 causes allocation of one or more hadron pages, one or more hadron sectors and their associated operating system files, one or more hadron blocks, and the associated indices and other metadata needed for the hadron space 220 that is being created. Once a hadron space 220 has been created, the hadron system 300 facilitates the define-dataset function 312 that receives input specifications (e.g., from a hadron system program or programmer) of the dataset (e.g., the dataset name, the dataset type, one or more initial dataset specifications of the elements of the dataset, and/or the like), and based on the received input, the hadron system 300 creates the required data structures and/or metadata of the hadron space 220, which are useful for the later creation of a dataset 320. Once a hadron space 220 has been created, the hadron system 300 facilitates the define-dataset function 312 that receives input specifications (e.g., from a hadron system program or programmer) of the dataset 320 (e.g., the dataset name, the dataset type, one or more initial dataset specifications of the elements of the dataset, and/or the like), and based on the input, hadron system 300 creates the required data structures (e.g., listing the dataset metadata in the CMX of the hadron system and the like, and creating the data structures of the user hadron space 222) and/or metadata for the dataset 320. Once the dataset 320 has been created, the hadron system 300 facilitates the put-data-into-dataset function 314 that receives input specifications and data (e.g., from a hadron system program or programmer) of the hadrons 327 (e.g., the data element name, specification, and data to go into the hadron holder 123, and/or the like), and based on the input, hadron system 300 creates the required data structures (e.g., listing the metadata in the CMX of the hadron system and the like, and creating the data structures of the hadron(s) 122) in the set 327 of hadron(s) for the data being put into the dataset 320) and/or metadata in the hadron pages 326 of one or more of the hadron blocks 325. Once the data in hadrons 327 has been put into dataset 320, the hadron system 300 facilitates the query-dataset function 316 that receives input specifications and data (e.g., from a hadron system program or programmer) that specifies the target output data (e.g., the address of an employee, where the programmer knows the name of the employee and the name of the dataset having the names and addresses of a plurality of employees), and the qualifying data (e.g., the name of the employee and the name of the dataset), and based on the input parameters of the query function 316, hadron system 300 outputs the data 330 that meets the query criteria.

Figure 3B:
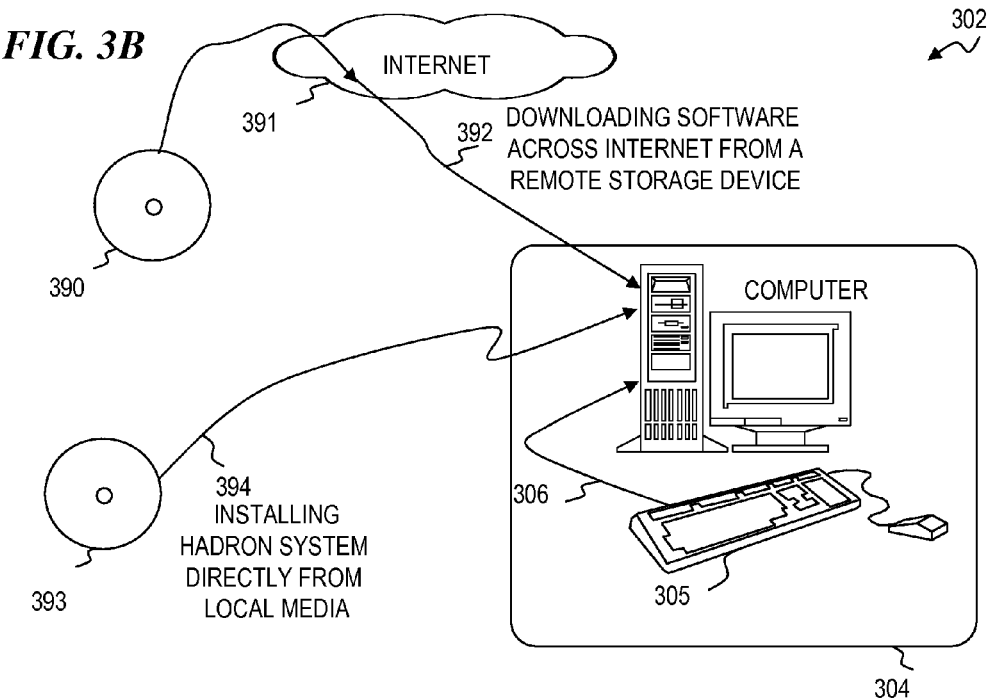
FIG. 3B is a block diagram of a software process and system 302 for installing and executing software that when executed on a computer 304 or similar information-processing device, according to some embodiments of the present invention.

FIG. 3B is a block diagram of a software process and system 302 for installing and executing software that when executed on a computer 304 or similar information-processing device, according to some embodiments of the present invention. In some embodiments, the hadron system software is loaded into a computer 304 (which includes a user-input subsystem 305) by downloading 392 software from a network 391 (such as the internet, proprietary wireless networks (such as cell-phone networks), or a manufacturer's internal network, for example). In other embodiments, methods of the present invention also include uploading or media-installing 394 of software from physical media 393 (e.g., CDROM, diskette, FLASH memory, and the like), sometimes also requiring substantial amounts of manual input 306 from a user via an input device 305 (such as a manual keyboard, mouse, or voice recognition). In some embodiments, the present invention provides an apparatus that includes a computer-readable storage medium 390 or 393 having instructions stored thereon for causing a suitably programmed information processor to execute a method that includes a computer-implemented method including the functions 301 shown and described in FIG. 3A and/or FIG. 5A through FIG. 5D. Is some embodiments, the methods are performed in a different order and/or other combinations or subcombinations of the component pieces than those shown.

Figure 4:
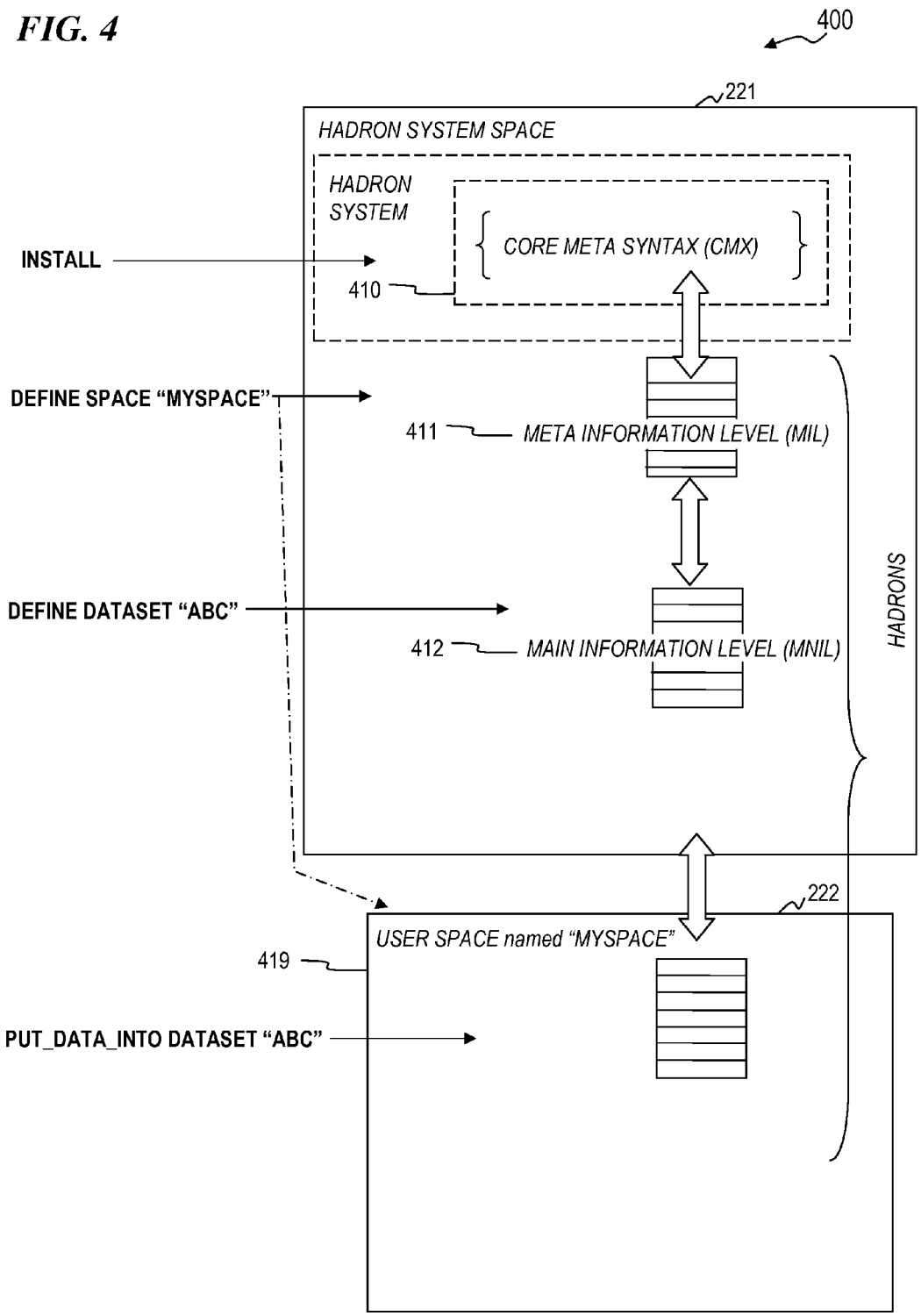
FIG. 4 is a schematic representation of a system 400 after the creation of a hadron space, definition of a dataset, and putting data for the dataset into hadrons according to some embodiments of the present invention.

FIG. 4 is a schematic representation of a hadron system 400 after the creation of a hadron space, definition of a dataset, and putting data for the dataset into hadrons according to some embodiments of the present invention. In some embodiments, hadron system 400 includes a hadron system space 221, where the install operation of the hadron system includes loading the core meta syntax (CMX) 410 that includes data structures and software. In some embodiments, the hadron system includes indices and functions that facilitate the hadron system in: —obtaining a HS_CMX_block (hadron-system core-meta-syntax block) identifier as the H-output value of a F→H function (described further below with regard to FIG. 5A) that uses the CMX_Code as the F-input value, and
obtaining a CMX_Code as the F-output value of an H→F function (described further below with regard to FIG. 5A) that uses the HS_CMX_Block as the H input value.

In some embodiments, a CMX name or expression is provided (e.g., is shown in reports, programmer aids, and the like) merely as an expression to assist the human user in understanding the function of each entry in the CMX.

Each specification element in CMX has an associated HS_CMX_Block that contains/defines the specification, and that is associated with a CMX_BlockID number. For the following abbreviated CMX table (Table 1), a few example elements are shown:

TABLE 1

| (CMX information) | | |
| --- | --- | --- |
| CMX_Code | CMX name (expression for human user) | HS_CMX_Block |
| 2 | setName | HS_CMX_Block1 |
| 6 | setType | HS_CMX_Block2 |
| ... | ... | ... |
| 201 | specName | HS_CMX_Block3 |
| 204 | specDataType | HS_CMX_Block4 |
| 205 | specToSetFrom | HS_CMX_Block5 |
| 213 | specDataSpace | HS_CMX_Block6 |

The numbers 2, 6, . . . 213 are CMX_Codes that are associated with the hadron system's CMX_blocks HS_CMX_block_1, HS_CMX_block_2, . . . HS_CMX_block_6. In some embodiments, the above information is implemented as a set of hadrons in which, for each hadron, the CMX_Code is used as the FID value and the HS_CMX_Block is used as the holder value. For example, in some embodiments,
HS_CMX_block_1 contains all the setNames (names for datasets) in the hadron system (actually, in some embodiments, the holders of hadrons in frames (having FID=2 (i.e., CMX_Code=2)) that are pointed to by HS_CMX_block_1 are setName);
HS_CMX_block_2 contains all the setTypes (dataset types) in the hadron system (actually, in some embodiments, the holders of hadrons in frames (having FID=6 (i.e., CMX_Code=6)) that are pointed to by—HS_CMX_block_2 are setType);
HS_CMX_block_3 contains all the specName (specification names) in the hadron system (actually, in some embodiments, the holders of hadrons in frames (having FID=201 (i.e., CMX_Code=201)) that are pointed to by HS_CMX_block_3 are specName);
HS_CMX_block_4 contains all the specDataType (specification data types) in the hadron system (actually, in some embodiments, the holders of hadrons in frames (having FID=204 (i.e., CMX_Code=204)) that are pointed to by HS_CMX_block_4 are specDataType);

HS_CMX_block_5 contains all the specToSetFrom (specification-to-dataset-from cross references) in the hadron system (actually, in some embodiments, the holders of hadrons in frames (having FID=205 (i.e., CMX_Code=205)) that are pointed to by HS_CMX_block_5 are specDataType);

HS_CMX_block_6 contains all the specDataSpaces (specifications of DataSpaces) in the hadron system (actually, hadrons in frames (having FID=213 (i.e., CMX_Code=213)) that are pointed to by CMX_block_6 are specDataSpace); and so on. The hadron system of the present invention provides this mechanism for easily indexing and adding to the CMX as future needs arise. Of course, the choice of a particular CMX_Code numbering scheme (which values are assigned to which functions) is a simple matter of design choice and can vary from embodiment to embodiment.

Defining a hadron space 220 (hadron system space 221 or hadron user space 222) associates the hadron space with one or more operating-system files used by the underlying OS to store data into sectors on the secondary storage (such as disks); associates the hadron space with one or more hadron pages having a hadron-page header/index and a hadron-page body, and later the hadron space is associated with hadron blocks that provide the hadron specifications for the hadrons. Each hadron page is associated with one or more sectors that are used to store and retrieve the hadrons that are later put into the hadron page.

Defining a dataset provides (as inputs to the hadron system) a dataset_name (chosen by the system programmer or application user), a dataset_type (selected from a pre-defined set of types), and specification_names and hadron specifications of the data elements.

The dataset_name and dataset_type get associated (by the hadron system) with a dataset_frame for the dataset (the dataset_name and dataset_type are placed (by the hadron system) in hadrons associated with the dataset_frame). In some embodiments, the specification_IDs and hadron specifications are associated (by the hadron system) with specification_frames (in some embodiments, one hadron frame for each specification used by the dataset; and for each: the specName (specification_identifier) (contained in one CMX block), the specDataType (specification) (contained in another CMX block), the specToSetFrom (dataset_frame_ID)(contained in yet another CMX block) and a dedicated datablockID (contained in still another CMX block) are placed in hadrons associated with that specification_frame).

When the user causes the hadron system to execute the command:

"DEFINE DATASET my_dataset AS LIST (S1 number, S2 string);"

the hadron system creates a FID (e.g., dataset_frame_1001) for the dataset (the setName (dataset_name) my_dataset and setType (dataset_type) LIST are placed in hadrons associated with the dataset_frame_1001);

the hadron system creates a specification_frame_1002 for the first specification (the specName (specification_ID) "S1" and specDataType (specification_type) "number" and dataset_frame_ID dataset_frame_1001 and datablockID datablock_1 are placed in hadrons associated with the dataset_frame_1002);

the hadron system creates a specification_frame_1003 for the second specification (the specification_ID "S2" and specification_type "string" and dataset_frame_ID dataset_frame_1001 and datablockID datablock_2 are placed in hadrons associated with the dataset_frame_1003). This dataset is created in the hadron user space 222 with the reference number 419 having the name "MY_SPACE."

When the user causes the hadron system to execute the command

"PUT DATA INTO my_dataset {1, 2, 3, 'abc', 'def'}"

the hadron system places the number elements 1, 2, 3 into hadrons in page(s) that are pointed to by (are associated with) datablock_1 and places the string elements 'abc', 'def' into hadrons in page(s) that are pointed to by (are associated with) datablock_2. Index information in the hadron page header indicates the locations of successive hadrons (data elements) in the hadron page body. Each hadron (data element) in the page is associated with a frameID (either a dataset_frameID or specification_frameID of the hadron frame that "contains" that hadron) of a frame that is associated with a hadron block that has the specification for that hadron. In some embodiments, the hadron system includes indices (e.g., in some embodiments, B+tree indices are used) to facilitate finding all holder values for a given FID and for finding all FIDs for a given holder value. Thus each hadron is stored/associated with a frameID (FID) of the frame that contains (and/or is associated with) the block(s) having the specification. Therefore, the specification is not stored for or with each hadron.

Figure 5A:
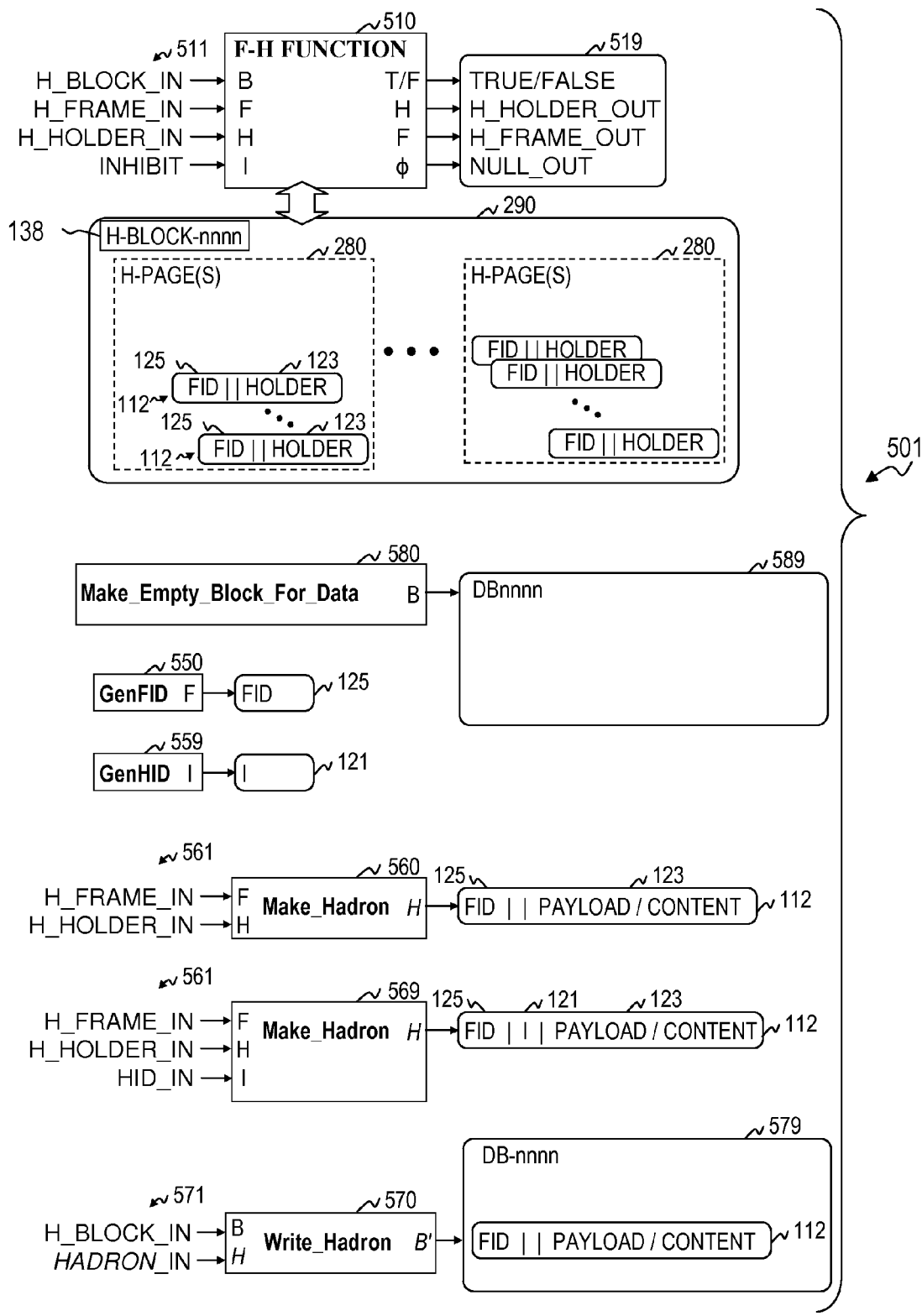
FIG. 5A is a schematic representation of a set 501 of functions 501 for the creation of hadrons and other data structures useful for data manipulation in the hadron data architecture according to some embodiments of the present invention.

FIG. 5A is a schematic representation of a set 501 of functions 501 for the creation of hadrons and other data structures useful for data manipulation in the hadron data architecture according to some embodiments of the present invention. In some embodiments, F-H lookup function 510 receives inputs 511 that include a plurality of the set of inputs that includes {H_BLOCK_IN (that specifies which hadron block to examine); H_FRAME_IN (that specifies which hadron frame to look for); H_HOLDER_IN (that specifies which hadron HOLDER to examine); and INHIBIT (that conditionally inhibits the output that would otherwise occur)}. In some embodiments, F-H lookup function 510 generates outputs 519 that include one or more of the set of outputs that includes {TRUE/FALSE (that indicates that both the FID specified in H_FRAME_IN and the holder specified in H_HOLDER_IN are in the hadron block specified in the H_BLOCK_IN); H_HOLDER_OUT (that indicates all the holder(s), if any, matched the H_FRAME_IN); H_FRAME_OUT (that indicates all the FID(s), if any, matched the H_HOLDER_IN); and NULL_OUT (that indicates no holders matched the H_FRAME_IN or that no FIDs matched the H_HOLDER_IN in the hadron block specified in the H_BLOCK_IN)}.

The hadron system 505 of the present invention (see the overall diagram of FIG. 5E, described below) makes extensive use of various forms of the F-H lookup functions 510 to organize data into stored hadrons 112 and to access the data in the stored hadrons 112 (for example, in database queries and the like). In some embodiments, each hadron block 290 has an associated hadron block label 138, a plurality of hadrons 112 each having a FID 125 and holder 123. In some embodiments, the hadron system includes a plurality of indices including a FID-to-holder lookup (F→H) index and a holder-to-FID lookup (H→F) index. In some embodiments, the plurality of hadrons 112 and the plurality of indices including F→H index and H→F index are further organized within one or more hadron pages 280 to further facilitate mapping to operating-system (OS) sectors that are stored and fetched from mass non-volatile storage (such as disk drives, FLASH drives and the like) in OS-handled files by the computer's OS. In other embodiments, the plurality of hadrons 112 and the plurality of indices including F→H index and H→F index are directly mapped to OS sectors without the intermediate hadron-page structures (i.e., in some embodiments, the hadron pages 280 are optional or omitted).

Note that F→H index 291 receives a value of a FID 125 as the input parameter, and provides a null output if no matching FID is found, or provides the data contents of one or more holders 123 if those holders are associated with a matching FID to the input FID, and H→F index 292 receives a value of a holder 123 as the input parameter, and provides a null output if no matching holder value is found, or provides the data contents of one or more FIDs 125 if those FIDs are associated with a holder that matches the input holder value. Note that indices 291 and 292 are shown in dashed boxes to indicate that in some embodiments, these are not part of CMX itself nor are they required in every embodiment.

Figure 5B:
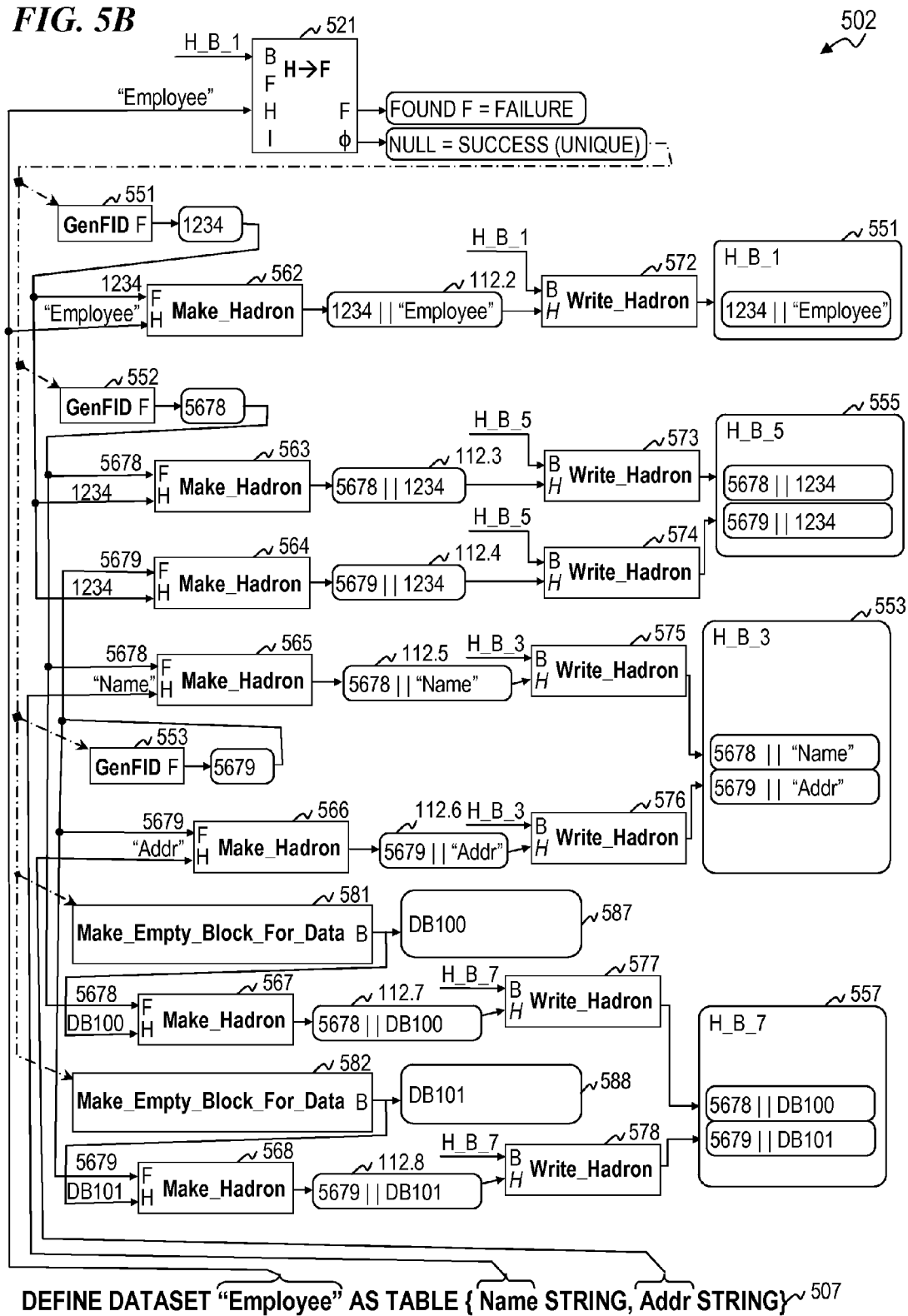
FIG. 5B is a schematic representation of the operation flow and data structures 502 of various ones of the functions 501 for the defining of a dataset according to some embodiments of the present invention.
Figure 5C:
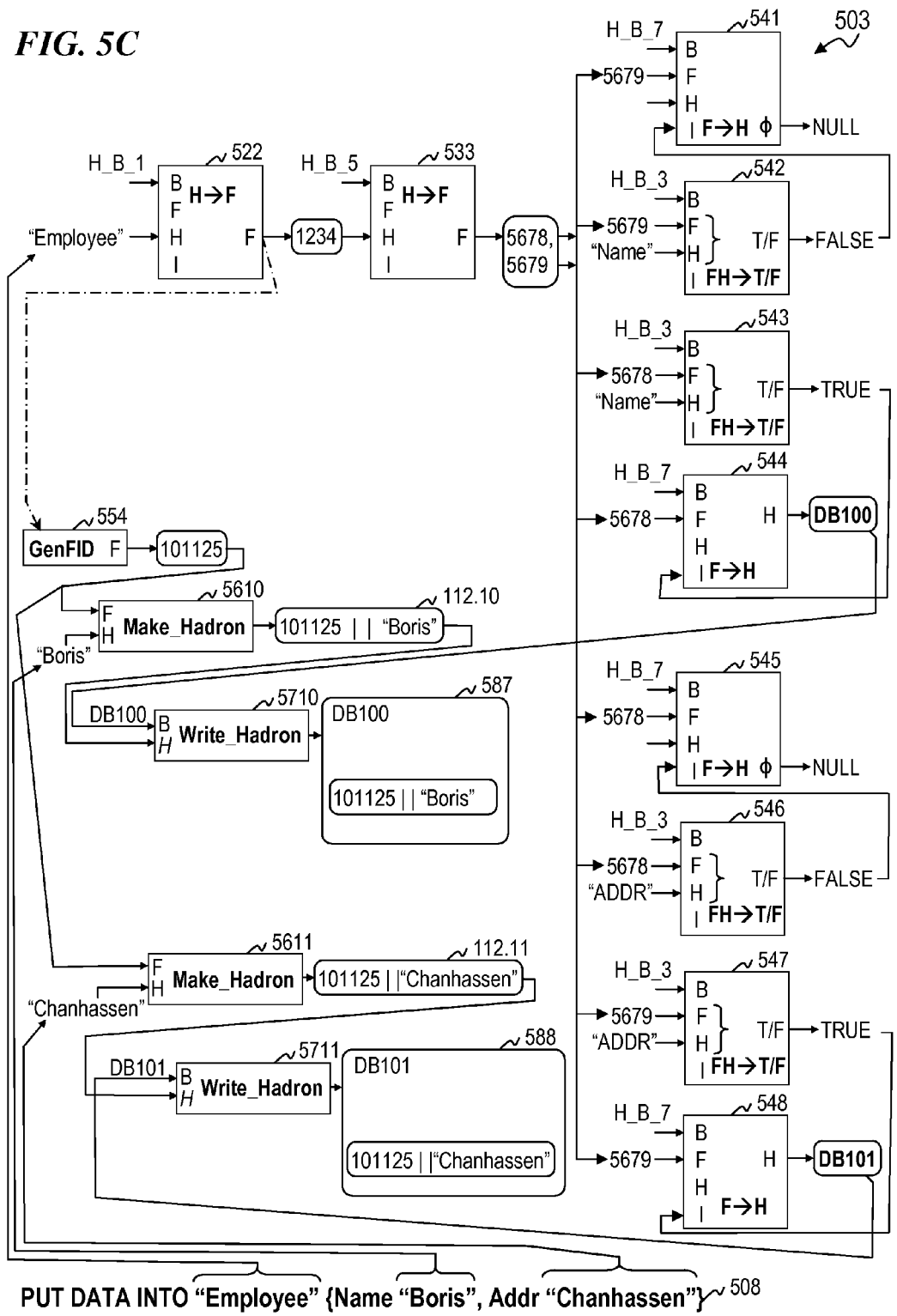
FIG. 5C is a schematic representation of the operation flow and data structures 503 of various of the functions 501 for the putting of data into a dataset according to some embodiments of the present invention.

This generic representation of all the F-H lookup functions 510 can be simplified as H→F lookup function 521, for example as shown in FIG. 5B, or H→F lookup function 522, for example as shown in FIG. 5C, (which receives inputs H_BLOCK_IN and H_HOLDER_IN, and outputs an H_FRAME_OUT if a FID is found having the matching holder or a NULL_OUT result if no FID is found). This generic representation of all the F-H lookup functions 510 can also be simplified as F→H lookup function 544 or 541, for example as shown in FIG. 5C, (which receives inputs H_BLOCK_IN and H_FRAME_IN, and outputs an H_HOLDER_OUT if a holder is found having the matching FID or a NULL_OUT result if no holder is found with a matching FID). This generic representation of all the F-H lookup functions 510 can also be simplified as frame-and-holder F&H lookup function 542 for example as shown in FIG. 5C, (which receives inputs H_BLOCK_IN, H_HOLDER_IN and H_FRAME_IN, and outputs a TRUE if a holder is found having the matching FID or a FALSE result if no holder is found with a matching FID).

In some embodiments, the set of functions 501 also includes a Make_Empty_Block_For_Data function 580 that generates the space and metadata needed for a hadron data block 589 (in some embodiments, equivalent to a hadron block 290 of FIG. 2A having an assigned identifier such as DBnnnn wherein nnnn=some unique integer for the hadron data block).

In some embodiments, the set of functions 501 also includes a GenFID (generate a new frame identifier) function 550 that outputs a value (e.g., a unique integer relative to other FIDs in the system) for a FID 125 to be later used for one or more hadrons 112. In some embodiments, the set of functions 501 also includes an optional GenHID (generate a new hadron identifier) function 559 that outputs a value (e.g., a unique integer relative to other I's in the system) for an 1121 to be later used for a single hadron 112.

In some embodiments, the set of functions 501 also includes a Make_Hadron function 560 (generate a new hadron 112 using the frame identifier specified by the H_FRAME_IN input and using the holder value in the H_HOLDER_IN input) that outputs a hadron 112 having the specified FID 125 and holder 123. In some embodiments, the set of functions 501 also includes a Make_Hadron function 569 (generate a new hadron 112 using the frame identifier specified by the H_FRAME_IN input, using the optional hadron identifier specified by the HID_IN input, and using the holder value in the H_HOLDER_IN input) that outputs a hadron 112 having the specified FID 125 and holder 123 and hadronID 1121.

In some embodiments, the set of functions 501 also includes a Write_Hadron (write a newly made hadron 112 using the block identifier specified by the H_BLOCK_IN input and using the hadron in the HADRON_IN input) function that outputs a modified hadron block B 579 having the specified hadron 112 written and indexed into one of its hadron pages 280.

FIG. 5B is a schematic representation of the operation flow and data structures system 502 of various ones of the functions 501 for the defining of a dataset according to some embodiments of the present invention. In some embodiments, the program command DEFINE DATASET "Employee" AS TABLE {Name STRING, Addr STRING} 507 starts by looking up in HS_BLOCK_1 (noted here as H_B_1) whether the holder value "Employee" has already been used for a dataset, and if so (if a FID is found having this holder) then the output returns as FAILURE (since, in some embodiments, the system does not allow two datasets with identical names), and if not (the NULL result) this is a successful result of the check of function 521, and system 502 then performs the following functions: GenFID 551 generates a new FID (e.g., here shown as FID=1234); Make_Hadron 562 receives inputs H_FRAME_IN=1234 and H_HOLDER_IN="Employee" and outputs hadron 112.2 (having FID=1234 and holder="Employee"); Write_Hadron 572 receives inputs H_BLOCK_IN=HS_BLOCK_1 (noted here as H_B_1) and hadron 112.2 and writes hadron 112.2 into hadron block HS_BLOCK_1 551.

GenFID 552 (enabled by the successful output from block 521) generates a new FID (e.g., here shown as FID=5678); Make_Hadron 563 receives inputs H_FRAME_IN=5678 and H_HOLDER_IN=1234 and outputs hadron 112.3 (having FID=5678 and holder=1234); Write_Hadron 573 receives inputs H_BLOCK_IN=HS_BLOCK_5 (noted here as H_B_5) and hadron 112.3 and writes hadron 112.3 into hadron block HS_BLOCK_5 555 (this allows lookups between FID=1234 and FID=5678). Make_Hadron 565 receives inputs H_FRAME_IN=5678 and H_HOLDER_IN="Name" and outputs hadron 112.5 (having FID=5678 and holder="Name"); Write_Hadron 575 receives inputs H_BLOCK_IN=HS_BLOCK_3 (noted here as H_B_3) and hadron 112.5 and writes hadron 112.5 into hadron block HS_BLOCK_3 553 (this allows lookups between FID=5678 and holder="Name").

GenFID 553 (enabled by the successful output from block 521) generates a new FID (e.g., here shown as FID=5679); Make_Hadron 564 receives inputs H_FRAME_IN=5679 and H_HOLDER_IN=1234 and outputs hadron 112.4 (having FID=5679 and holder=1234); Write_Hadron 574 receives inputs H_BLOCK_IN=HS_BLOCK_5 (noted here as H_B_5) and hadron 112.4 and writes hadron 112.4 into hadron block HS_BLOCK_5 555 (this allows lookups between FID=1234 and FID=5679). Make_Hadron 566 receives inputs H_FRAME_IN=5679 and H_HOLDER_IN="Addr" and outputs hadron 112.6 (having FID=5679 and holder="Addr"); Write_Hadron 576 receives inputs H_BLOCK_IN=HS_BLOCK_3 (noted here as H_B_3) and hadron 112.6 and writes hadron 112.6 into hadron block HS_BLOCK_3 553 (this allows lookups between FID=5679 and holder="Addr").

Make_Empty_Block_For_Data 581 (enabled by the successful output from block 521) generates an empty hadron block 587 (here called DB100); Make_Hadron 567 receives inputs H_FRAME_IN=5678 and H_HOLDER_IN="DB100" and outputs hadron 112.7 (having FID=5678 and holder=DB100); Write_Hadron 577 receives inputs H_BLOCK_IN=HS_BLOCK_7 (noted here as H_B_7) and hadron 112.7 and writes hadron 112.7 into hadron block HS_BLOCK_7 557 (this allows lookups between FID=5678 and holder=DB100).

Make_Empty_Block_For_Data 582 (enabled by the successful output from block 521) generates an empty hadron block 580 (here called DB101); Make_Hadron 568 receives inputs H_FRAME_IN=5679 and H_HOLDER_IN="DB101" and outputs hadron 112.8 (having FID=5679 and holder=DB101); Write_Hadron 578 receives inputs H_BLOCK_IN=HS_BLOCK_7 (noted here as H_B_7) and hadron 112.8 and writes hadron 112.8 into hadron block HS_BLOCK_7 557 (this allows lookups between FID=5679 and holder=DB 101).

In some embodiments, hadron system blocks HS_BLOCK_1 551, HS_BLOCK_3 553, HS_BLOCK_5 555, and HS_BLOCK_7 557 are all part of CMX 410 shown in FIG. 4.

FIG. 5C is a schematic representation of the operation flow and data structures system 503 of various of the functions 501 for the putting of data into a dataset according to some embodiments of the present invention. In some embodiments, the program command PUT DATA INTO "Employee" {Name "Boris", Addr "Chanhassen"} 508 (which puts the name and address of an employee named "Boris" who has an address of "Chanhassen" into the dataset named "Employee") starts by performing a holder-to-frame H→F lookup function 522 in HS_BLOCK_1 (noted here as H_B_1) whether the holder value "Employee" exists for a dataset (such data are stored in HS_BLOCK_1), and if so (if a FID is found having this holder) then the output returns as SUCCESS (in this case with FID=1234, since, as shown in FIG. 5B this dataset has been defined), and system 503 then performs the following functions: holder-to-frame H→F lookup function 533 with inputs H_HOLDER_IN=1234 and H_BLOCK_IN=HS_BLOCK_5 (noted here as H_B_5) which outputs two FIDs 125 (FID=5678 and FID=5679).

In some embodiments, frame-and-holder F&H lookup function 542 has inputs H_FRAME_IN=5679, H_HOLDER_IN="Name", and H_BLOCK_IN=HS_BLOCK_3 (noted here as H_B_3), but outputs a FALSE result since there is no hadron having FID=5679 and holder="Name", and this FALSE result inhibits the output (i.e., forces a NULL output) of frame-to-holder F→H lookup function 541 (which otherwise would lookup to find a holder of a hadron having FID=5679 in HS_BLOCK_7 (noted here as H_B_7). On the other hand, frame-and-holder F&H lookup function 543 has inputs H_FRAME_IN=5678, H_HOLDER_IN="Name", and H_BLOCK_IN=HS_BLOCK_3 (noted here as H_B_3), and outputs a TRUE result since there is a hadron having FID=5678 and holder="Name", and this TRUE result enables the output of frame-to-holder F→H lookup function 544 (which does a lookup to find the holder of a hadron having FID=5678 in HS_BLOCK_7 (noted here as H_B_7), and thus F→H 544 outputs "DB100".

GenFID 554 (enabled by the successful output from block 522) generates a new FID (e.g., here shown as FID=101125); Make_Hadron 5610 receives inputs H_FRAME_IN=101125 and H_HOLDER_IN="Boris" and outputs hadron 112.10 (having FID=101125 and holder="Boris"); Write_Hadron 5710 receives inputs H_BLOCK_IN=DB100 (the hadron data block 587 created for names in FIG. 5B) and hadron 112.10 and writes hadron 112.10 into hadron block DB100 587 (this allows lookups between FID=101125 and holder="Boris").

In some embodiments, frame-and-holder F&H lookup function 546 has inputs H_FRAME_IN=5678, H_HOLDER_IN="Addr", and H_BLOCK_IN=HS_BLOCK_3 (noted here as H_B_3), but outputs a FALSE result since there is no hadron having FID=5678 and holder="Addr", and this FALSE result inhibits the output (i.e., forces a NULL output) of frame-to-holder F→H lookup function 545 (which otherwise would lookup to find a holder of a hadron having FID=5678 in HS_BLOCK_7 (noted here as H_B_7). On the other hand, frame-and-holder F&H lookup function 547 has inputs H_FRAME_IN=5679, H_HOLDER_IN="Addr", and H_BLOCK_IN=HS_BLOCK_3 (noted here as H_B_3), and outputs a TRUE result since there is a hadron having FID=5679 and holder="Addr", and this TRUE result enables the output of frame-to-holder F→H lookup function 548 (which does a lookup to find the holder of a hadron having FID=5679 in HS_BLOCK_7 (noted here as H_B_7), and thus F→H 548 outputs "DB101".

Make_Hadron 5611 receives inputs H_FRAME_IN=101125 and H_HOLDER_IN="Chanhassen" and outputs hadron 112.11 (having FID=101125 and holder="Chanhassen"); Write_Hadron 5711 receives inputs H_BLOCK_IN=DB101 (the hadron data block 588 created for holding addresses) and hadron 112.11 and writes hadron 112.1 into hadron block DB101 588 (this allows lookups between FID=101125 and holder="Chanhassen").

Note that now FID=101125 is the frame for a particular employee record in dataset "Employee" that has a Name="Boris" and an Addr="Chanhassen". The indices in the hadron system allow a very fast lookup of the addresses of all employees in dataset Employee having a Name="Boris", of the names of all employees in dataset Employee having an Addr="Chanhassen", and the like. A person of skill in the art will readily recognize that this method and structure is easily extended to very complex datasets of any data type or structure, as shown in the following simplified query example.

Figure 5D:
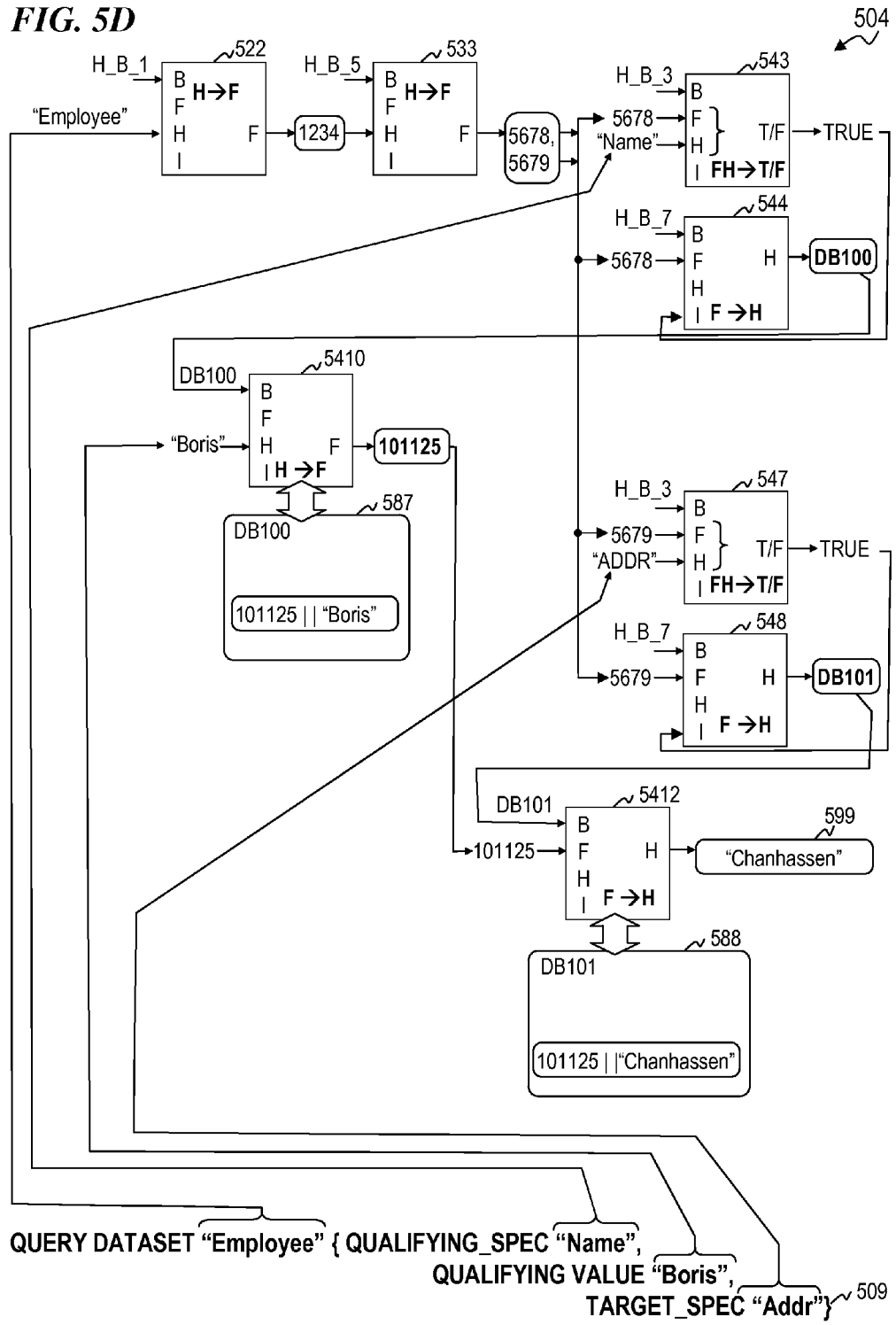
FIG. 5D is a schematic representation of the operation flow and data structures 504 of various of the functions 501 for the querying of data of a dataset according to some embodiments of the present invention.

FIG. 5D is a schematic representation of the operation flow and data structures 504 of various of the functions 501 for the querying of data of a dataset according to some embodiments of the present invention. In some embodiments, the program command QUERY DATASET "Employee" {QUALIFYING_SPEC "Name", QUALIFYING VALUE "Boris", TARGET_SPEC "Addy"} 509 (which queries the dataset "Employee" for any records having the Name="Boris" to find their address) starts by performing a holder-to-frame H→F lookup function 522 in HS_BLOCK_1 (noted here as H B1) whether the holder value "Employee" exists for a dataset (such data are stored in HS_BLOCK_1), and if so (if a FID is found having this holder) then the output returns as SUCCESS (in this case with FID=1234, since, as shown in FIG. 5B this dataset has been defined), and system 504 then performs the following functions: holder-to-frame H→F lookup function 533 with inputs H_HOLDER_IN=1234 and H_BLOCK_IN=HS_BLOCK_5 (noted here as H_B_5) which outputs two FIDs 125 (FID=5678 and FID=5679). Lookup functions F&H 542, F→H 541, F&H 546, and F→H 545 of FIG. 5C are not shown here to simplify this diagram.

F&H 543 has inputs H_FRAME_IN=5678, H_HOLDER_IN="Name", and H_BLOCK_IN=HS_BLOCK_3, and outputs a TRUE result since there is a hadron having FID=5678 and holder="Name" in H_B_3, and this TRUE result enables the output of frame-to-holder F→H lookup function 544 (which does a lookup to find the holder of a hadron having FID=5678 in HS_BLOCK_7, and thus F→H 544 outputs "DB100". H→F 5410 has inputs H_BLOCK_IN=DB100 (from F→H 544) and H_HOLDER_IN="Boris" from the command 509, and outputs FID=101125 from the appropriate hadron 112.10 (having FID=101125 and holder="Boris"). The hadron system includes indices (e.g., in some embodiments, a plurality of B+tree indices) that facilitate this lookup.

F&H 547 has inputs H_FRAME_IN=5679, H_HOLDER_IN="Addr", and H_BLOCK_IN=HS_BLOCK_3, and outputs a TRUE result since there is a hadron having FID=5679 and holder="Addr", and this TRUE result enables the output of F→H 548 (which does a lookup to find the holder of a hadron having FID=5679 in HS_BLOCK_7, and thus F→H 548 outputs "DB101". F→H 5412 (which does a lookup to find the holder of a hadron having FID=101125 in DB101, and thus F→H 5412 outputs "Chanhassen" 599, which is the result of the query.

Figure 5E:
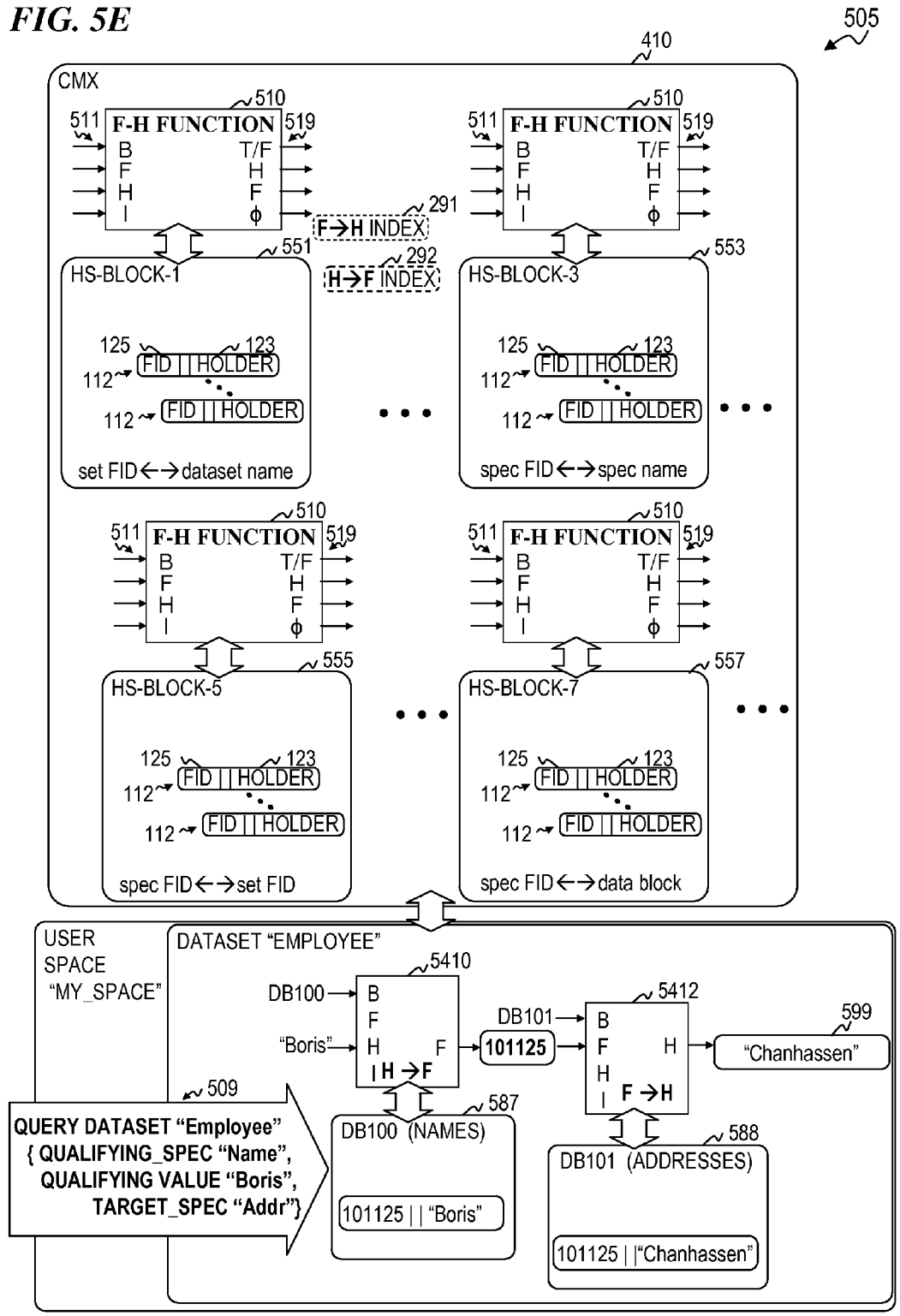
FIG. 5E is an overview schematic representation of the operation flow and data structures 505 for the querying of data of a dataset using the hadron core meta syntax, according to some embodiments of the present invention.

FIG. 5E is an overview schematic representation of the operation flow and data structures of the hadron system 505 for the querying of data of a dataset using the hadron core meta syntax 410, according to some embodiments of the present invention. In some embodiments, the F-H function 510, or its equivalents, is used throughout the hadron system 505 to lookup all FIDs for a given input holder value, or to lookup all holder values for a given input FID, or to check whether both a given input FID and holder value are both in a given hadron block. Hadron system 505 provides the CMX structure 410 for creating a dataset, putting data into the dataset, and then answering a query such as query 509 to obtain a requested output value 599.

FIG. 6 is a schematic representation of certain relationships 600 of hadron frames 6125, hadron blocks 6290, and hadrons 112 according to some embodiments of the present invention. Each hadron block "holds" hadrons of the same data type. The specification of each block applies to the data in the holder of all hadrons in that block, so there is no need to store a separate specification for each hadron. In some embodiments, a plurality of hadron blocks 6290 (such as hadron blocks 290 of FIG. 2A-2E) each have a plurality of hadrons 112 written into the hadron blocks 6290. In this example, the hadron block=77001 has one hadron 112 with frame FID=88001, two hadrons 112 with frame FID=88002, and one hadron 112 with frame FID=88003; wherein all of the hadrons 112 in hadron block=77001 all share a common specification 1 6122.1 (such as the specification 122 described in FIG. 1A), wherein this first specification is associated with hadron block=77001. The hadron block=77002 has one hadron 112 with frame FID=88001, two hadrons 112 with frame FID=88003, and no hadron 112 with frame FID=88002; wherein all of the hadrons 112 in hadron block=77002 all share a common specification 2 6122.2, wherein this second specification is associated with hadron block=77002. The hadron block=77003 has one hadron 112 with frame FID=88004; wherein all of the hadrons 112 in hadron block=77003 all share a common specification 3 6122.3, wherein this third specification is associated with hadron block=77003. The hadron block=77004 has one hadron 112 with frame FID=88004; wherein all of the hadrons 112 in hadron block=77004 all share a common specification 3 6122.4, wherein this fourth specification is associated with hadron block=77004. Note that all of the hadrons in each block are stored in one or more hadron pages that are associated with that hadron block, as described below for FIG. 7.

FIG. 7 is a schematic representation of certain relationships 700 of hadron spaces, hadron frames, hadron blocks, and hadron pages, and operating-system sectors and files according to some embodiments of the present invention. In some embodiments, the hadron space 220 having the name MY_SPACE includes two hadron blocks 290 (i.e., hadron block=H224-2-2 and hadron block=H224-2-1). Hadron block=H224-2-2 includes two hadron pages 280 (i.e., hadron page=11101 which is mapped to a plurality of operating-system (OS) sectors 274 (sector=1, sector=2, sector=3 . . . ) and hadron page=11102, which is mapped to a plurality of operating-system (OS) sectors 274 (sector=4, sector=5, sector=6 . . . )). In some embodiments, the OS (sector=1, sector=2, sector=3 . . . ) are mapped by the operating system (which moves files to and from disk storage or other bulk storage) to the OS file named C:\ABC\KLM\FILE1.HAD, and the OS (sector=4, sector=5, sector=6 . . . ) are mapped by the operating system to the OS file named C:\ABC\KLM\FILE2.HAD. Similarly, hadron block=H224-2-1 includes two hadron pages 280 (i.e., hadron page=11103 which is mapped to a plurality of operating-system (OS) sectors 274 (sector=7, sector=8, sector=9 . . . ) and hadron page=11104, which is mapped to a plurality of operating-system (OS) sectors 274 (sector=10, sector=11, sector=12 . . . )), and the OS (sector=7, sector=8, sector=9 . . . ) are mapped by the operating system to the OS file named C:\XYZ\ABC\FILE3.HAD, and the OS (sector=10, sector=11, sector=12 . . . ) are mapped by the operating system to the OS file named C:\XYZ\KLM\FILE4.HAD. In some embodiments, the hadron system moves data (e.g., such as the hadron shown in cross-hatching in OS sector=9) directly into and from the OS sectors 274, and relies on the OS to store the files and retrieve the files from the storage (such as disk drives and the like).

Figure 8A:
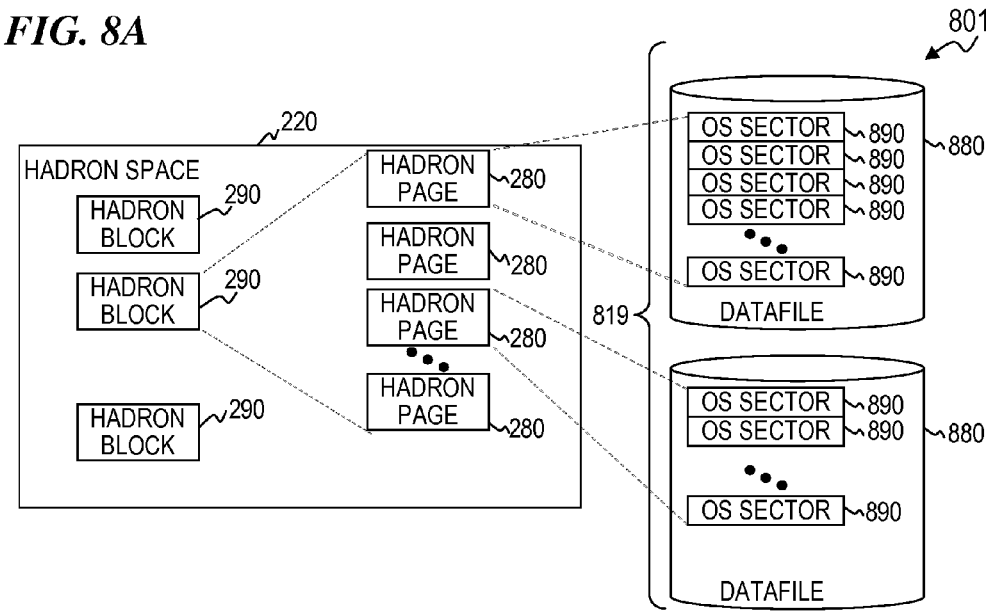
FIG. 8A is a schematic representation of certain relationships 801 of hadron blocks and hadron pages, and operating-system sectors and files according to some embodiments of the present invention.

FIG. 8A is a schematic representation of certain relationships 801 of hadron blocks and hadron pages, and operating-system sectors and files as moved to and from the storage 819 (such as disk drives 880 and the like) according to some embodiments of the present invention. As described above in FIG. 7, the hadron system manages the organization, indexing and metadata in the hadron blocks 290 and hadron pages 280 of hadron spaces 220. The underlying operating system (such as Windows®, Linix® and the like) moves the OS sectors 274 to and from disk sectors 890 (in some embodiments, such as disk sectors 278 of FIG. 2A) on disk drives 880 (in some embodiments, such as disk drives 279 of FIG. 2A).

Figure 8B:
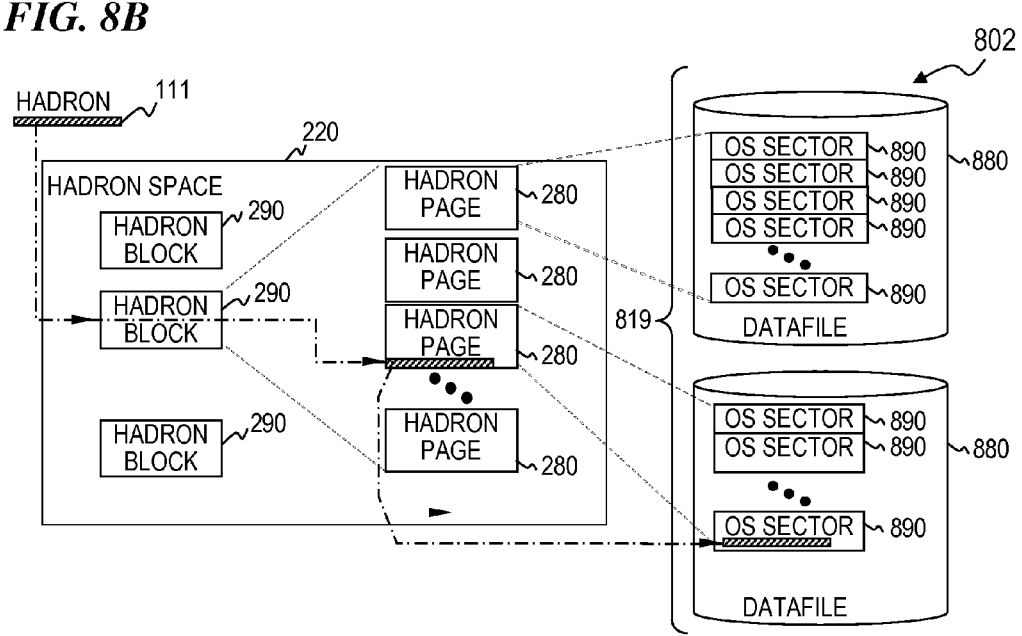
FIG. 8B is a schematic representation of certain relationships 802 of a set of hadrons in hadron blocks and hadron pages, and operating-system sectors and files according to some embodiments of the present invention.

FIG. 8B is a schematic representation of certain relationships 802 of a set of hadrons in hadron blocks and hadron pages, and operating-system sectors and files according to some embodiments of the present invention. This diagram is substantially similar to FIG. 8A, but in addition shows a particular hadron 111 that is written through its hadron block 290 (which implicitly provides the specification for the hadron's holder) into a page 290 (which provides the storage and indexing between holders and FIDs of all the hadrons on the hadron page including the particular hadron shown in cross-hatching here in a particular one hadron page 280), which the OS then stores to and fetches from a file's OS disk sector 890 (where again, the particular hadron shown in cross-hatching here in a particular one of the disk sectors 890).

By definition in some embodiments of the present invention:
- A hadron 112 always belongs to a hadron frame 102.
- A Dataset (reference 502 in FIG. 5B below) is set of data elements or members and the metadata that inter-relates and indexes the elements.
- A Data Structure can be of any known data-structure type, e.g., list, tree, matrix, table, record, etc.
- The Core Meta Syntax (CMX) level (reference number 410 in FIG. 4) includes an initial core software system of linguistic terms, such as "datasetName", "datasetIdentifier", "specName", "spec Identifier", etc., which constitute basic specifications, dimensions or categories into which particular data elements, when later entered by an end-user, will be categorized.

For example, a programmer or the system may define a dataset as follows:

"DEFINE DATASET my_graph AS GRAPH OF string data"

The hadron system code would then use the CMX to allocate storage areas and data elements such as "datasetName", "datasetIdentifier", "specName", "spec Identifier", etc., as needed for the my_graph dataset. These are later used to receive the data elements entered by the end user.

The Core Meta Syntax statically exists in the hadron software system core and forms a basic set of specifications upon which the S components of other hadrons build. (In some embodiments, each CMX category is associated with its own hadron block (concerning which, see below), which eliminates the need for S components of other hadrons.)

Meta Information Level (MIL—reference number 411 in FIG. 4) includes a set 105 (see FIG. 1B) of frames 102, which define meta information of virtual hadrons 111, i.e., what the virtual hadron 111 holds, in which form, etc.

Main information level (MNIL—reference number 412 in FIG. 4) includes a set of frames 102, holding the main body of data.

S-bonding is a process of referencing between the CMX-level code and MIL-level frames, and also a process of referencing between MIL-level frames and MNIL-level frames.

D-bonding is a process of referencing between MIL-level frames and MNIL-level frames, and also a process of referencing between frames within the MNIL level itself.

Data type is the type of data in the holder H component 123 of a virtual hadron 111. The data type may be primitive data types like STRING, NUMBER, DATE, TIME, etc., or hadron-specific data types like HF (hadron-to-frame—a referencing data type pertaining to the hadron system, described further below) or HH (hadron-to-hadron—a referencing data type pertaining to the hadron system, described further below). The data type may also be a user-defined data type of any complexity chosen by the programmer.

A Hadron Data Block (often, simply called a hadron block—e.g., reference 290 in FIG. 2A) is a physical unit containing (or being associated with) hadrons 112 that all have the same data type in their holder H components 123. Since a hadron frame 102 may contain hadrons 112 with different data types, a frame 102 has the capability to span a number of blocks.

A Domain is a Dataset (see FIG. 5B and FIG. 5C) containing a set of data elements pertaining to some group, such as a set of integers, a set of strings, a set of cities, and a set of seasonal temperatures. A simple domain usually consists of one frame 102 only.

Again, the present invention provides some embodiments that omit one or more aspects described herein, and/or that combine two or more aspects into a single embodiment. In some embodiments, all user and system data and programs that reside on non-transitory writable storage media are embedded into hadron data elements that reside in holder H components 123 of hadrons 112, with the hadrons 112 organized in hadron frames 102, while only an extremely small amount of program code (such as the basic input/output storage (BIOS) or unified extensible firmware interface (UEFI)) is used to bootstrap the computer and start the rest of the operating system (OS), which then uses hadrons 112 to hold all its program code (i.e., the OS itself, and all application and browser code, are stored in hadrons 112) and data (i.e., all application data, user data, and system data are stored in hadrons 112).

Hadron Storage Levels: The Hadron Storage architecture includes three levels, which are illustrated in architecture 400 of FIG. 4:

1. Core Meta Syntax (CMX) (reference number 410), which determines the core system linguistics and provides specification to the Meta Information Level by S-Bonding.
2. Meta Information Level (MIL) (reference number 411), which holds the specification for S-Bonding to the Main Information Level.
3. Main Information Level (MNIL) (reference number 412)—main storage body.

The Core Meta Syntax (CMX) level 410 is a part of the core software and, while it easily can be extended to add new CMX code elements, it is usually static for a given system embodiment (or version). In some embodiments, the CMX is not structured in hadrons 112. It is structured depending upon the specifics of an implementation.

The Meta Information Level (MIL) 411 and the Main Information Level (MNIL) 412 are comprised of hadrons 112 and are dynamic.

Core Meta Syntax (CMX): The Core Meta Syntax consists of linguistic expressions, which are used to signify the meaning of content of Holders 123 of the Meta Information Level 411. Every expression has the following descriptors:

1. Unique CMX_Index (also called the CMX_Code), represented by integer. In some embodiments, the CMX_Index is to be S-Bonded into hadrons of the Meta Information Level 411. (That is, one or more unique integer(s) of the CMX_Index will appear in the specification S component 122 of one or more particular hadrons 112 of the Meta Information Level 411. In this respect, a CMX_ Index integer has the characteristics of a frame FID integer, which through S-Bonding may appear in the specification S component 122 of a particular hadron 112.) In some embodiments, the programmer of CMX_ Index may choose to use frames and S-bonding to implement some or all of the metadata that describes basic data types within the CMX level 410, and thus the CMX_Index integers may also or alternatively include FIDs of frames reserved within the CMX_ Index.
2. Expression (which in some embodiments is a brief nominal descriptive characterization of the data of the Holder 123 of the S-Bonded hadron 112).
3. Data Type of Holder 123 of S-Bonded hadron 112.
4. Allowed values (Optional).

The Core Meta Syntax (CMX) may have any number of expressions of any level of expressiveness. Again, CMX is a part of the core software of the present invention and is usually static for a given system embodiment (or version), but can easily can be extended to add new CMX code elements for new system embodiments (or versions).

TABLE 2

Example of Core Meta Syntax (CMX) Level 410

| CMX_Index | Expression | Data Type | Allowed Values |
|---|---|---|---|
| 2 | Dataset Name | String | |
| 6 | Dataset Type | String | List, Tree, Table, Graph |
| 103 | Dataset Id | Number | |

In the example in Table 2, the CMX_Code="2" of the expression Dataset Name will be used to S-Bonded virtual hadrons 111 of the Meta Information Level 411 (where the particular CMX_Code, "2", will appear in the specification S component 122 of a bonded hadron 112). It will allow a String to be held in the holder H component 123 of such a hadron 112 bonded at the Meta Information Level 411 (specifically, will insert the string value of the expression 'Dataset Name' into the holder H component 123 of the hadron 112).

Meta Information Level (MIL):

The Meta Information Level 411 includes hadrons 112, the specification S components 122 of which are S-Bonded from the CMX level 410.

For purposes of explanation, a number of cases will be presented below. (Specifically: Case #1—Empty Set; Case #2—Non-Empty set with one member; Case #3—List; Case #4—List, with one member of the list being itself a list.) Each case is represented in three parts:

1. Syntax—Core Meta Syntax (CMX) level 410
2. Meta—Meta Information Level (MIL) 411
3. Data—Main Information Level (MNIL) 412.

It is to be noted that the eight illustrative cases below, which show how the present invention's hadron-architecture data-storage system organizes data, are illustrations of what may be characterized as the "system level" operation of the present invention, which is an "internal" level of operation that is opaque to the end-user of the invention, who interacts with the installed system through certain user commands of the hadron data language (HDL). The tables below that represent the three parts listed above (1. Syntax, 2. Meta, and 3. Data) are for purposes of expositional display only. Although the elements displayed in these tables for each illustrative case are indeed generated "internally" by the present invention's hadron-architecture data-storage system, the tables below do not represent the way data are actually stored in the present invention.

Case #1—Empty Set

Assume the need to store one empty set { }. The empty set does not have any elements and also, in this case, does not have a name.

In some embodiments, every hadron 112 belongs to a hadron frame 101 with a specific FID 125, is associated with a specification component "S" 122, and consists of two elements:

1. hadron Id component "I" 121
2. holder component "H" 123

Also, every hadron 112 must be unique within its universe. "Universe" here is used in the sense of "universe of discourse," meaning a set that contains all the objects that enter into our discussion.

Every hadron 112 is to be created at a certain point of time. In some embodiments, within a universe, no two hadrons 112 may be created at (and marked at, or marked with) the same point in time.

For the case of storing one empty set { }, then:

TABLE 2.1

(1) Syntax: Core Meta Syntax (CMX) Level 410

| CMX_Code | Expression | Data Type | Allowed Values |
|---|---|---|---|
| 2 | Dataset Name A | String | |
| 6 | Dataset Type | String | List, Tree, Table, Graph |
| 103 | Spec to Dataset | D-Bond-HF | |
| 104 | Spec Data Type | String | String, Number, Date, Boolean |

TABLE 2.2

(2) Meta: Meta Information Level (MIL) 411

| FID | I | S | H |
|---|---|---|---|
| 1000 | 980 | 100 | SYS1234 |

The hadron 112 may be identified by I=an integer representing "Feb. 3, 2011, 12:34:23"—the time of the hadron creation (for example, note that programs such as Excel may store the date Feb. 3, 2011, 12:34:23 as a number 40577.5238773148 where the 40577 represents the number of days since Jan. 1900, and the fraction represents the time of day; dropping the decimal point (or multiplying by 10,000,000,000) results in an integer corresponding to the date and time, in this instance 405775238773148). The time may also be represented as a number of time units (milliseconds, for instance) from a chosen point in time. It may also be represented as a unique sequential number. The specification S=100, S-Bonded from the CMX level 410, specifies "Dataset Name" linguistic expression. The holder H=SYS 1234 represents the hadron name, which was system generated (which occurs when no name is explicitly specified). The hadron identifier I component 121 would contain a unique integer associated with this "hadron name".

TABLE 2.3

(3) Data: Main Information Level (MNIL) 412

| FID | I | S | H |
|---|---|---|---|

There is no Data level because the dataset { } is empty at this time.

Case #2—Non-Empty set with one member. Consider the example:

Litres_in_gallon {3.785411784}

TABLE 3.1

(1) Syntax: Core Meta Syntax (CMX) Level 410

| CMX_Code | Expression | Data Type | Allowed Values |
|---|---|---|---|
| 2 | Dataset Name A | String | |
| 6 | Dataset Type | String | List, Tree, Table, Graph |
| 103 | Spec to Dataset | D-Bond-HF | |
| 104 | Spec Data Type | String | String, Number, Date, Boolean |

TABLE 3.2

(2) Meta: Meta Information Level (MIL) 411

| FID | I | S | H |
|---|---|---|---|
| 1001 | 678 | 100 | litres_in_gallon |
| 1001 | 679 | 101 | List |
| 1002 | 680 | 102 | 1001 |
| 1002 | 681 | 103 | Number |

In the above example, there are two hadron frames, one frame with FID=1001 with two hadrons each having the 1001 FID indicator, and another frame with FID=1002 with two hadrons each having the 1002 FID indicator. Hadrons of the frame FID=1001 (hadrons with Identifiers I=678 and I=678, or simply referred to as hadron I=678 and hadron I=679) are S-Bonded with 100 (Dataset Name) and 101 (Dataset Type)

from the CMX level. Hadrons of the frame FID=1002 (hadrons I=680 and I=681) are S-Bonded with 102 (Spec to Dataset) and 103 (Spec Data Type). The hadron with Identifier 680 (or simply hadron I=680) is D-Bonded by frame FID=1001.

By these two frames and their hadrons the invention has defined the Meta Information of the set litres_in_gallon {3.785411784} set.

Adding the actual set member is done at the Main Information Level 412:

TABLE 3.3

(3) Data: Main Information Level (MNIL) 412

| FID | I | S | H |
|---|---|---|---|
| 1003 | 682 | 1002 | 3.785411784 |

Hadron 682 belongs to frame FID=1003. S=1002 is S-Bonded from the Meta Information Level 411 and defines the holding (i.e., the data contents) within holder H 123 of the hadron as Numeric.

In some embodiments, the combined picture of both MIL 411 and MNIL 412 levels is as follows in Table 3.4:

TABLE 3.4

Combined MIL 411 and MNIL 412

| FID | I | S | H |
|---|---|---|---|
| 1001 | 678 | 100 | litres_in_gallon |
| 1001 | 679 | 101 | List |
| 1002 | 680 | 102 | 1001 |
| 1002 | 681 | 103 | Number |
| 1003 | 682 | 1002 | 3.785411784 |

Case #3—List. Consider the example:

Years_of_WWII {1939, 1940, 1941, 1942, 1943, 1944, 1945}

TABLE 4.1

(1) Syntax: Core Meta Syntax (CMX) Level 410

| CMX_Code | Expression | Data Type | Allowed Values |
|---|---|---|---|
| 2 | Dataset Name A | String | |
| 6 | Dataset Type | String | List, Tree, Table, Graph |
| 103 | Spec to Dataset | D-Bond-HF | |
| 104 | Spec Data Type | String | String, Number, Date, Boolean |

TABLE 4.2

(2) Meta: Meta Information Level (MIL) 411

| FID | I | S | H |
|---|---|---|---|
| 1001 | 678 | 100 | Years_of_WWII |
| 1001 | 679 | 101 | List |
| 1002 | 680 | 102 | 1001 |
| 1002 | 681 | 103 | Number |

TABLE 4.3

(3) Data: Main Information Level (MNIL) 412

| FID | I | S | H |
|---|---|---|---|
| 1003 | 690 | 1002 | 1939 |
| 1003 | 691 | 1002 | 1940 |
| 1003 | 692 | 1004 | 1942 |
| 1003 | 693 | 1002 | 1942 |
| 1003 | 694 | 1002 | 1943 |
| 1003 | 695 | 1002 | 1944 |
| 1003 | 696 | 1002 | 1945 |

Case #4—List, with one member of the list being itself a list

Consider the example:

Years_of_WWII {1939, 1940, {1941, Pearl Harbor}, 1942, 1943, 1944, 1945}

In this case, there is a set of two members, which set is a member of another set. This relationship requires making an addition to CMX syntax. The new Core Meta Syntax looks like:

TABLE 5.1

(1) Syntax: Core Meta Syntax (CMX) Level 410

| CMX_Code | Expression | Data Type | Allowed Values |
|---|---|---|---|
| 2 | Dataset Name A | String | |
| 6 | Dataset Type | String | List, Tree, Table, Graph |
| 103 | Spec to Dataset | D-Bond-HF | |
| 104 | Spec Data Type | String | String, Number, Date, Boolean |
| 105 | Dataset A includes Dataset A1 | D-Bond-HF | |
| 106 | Dataset A belongs to Dataset Z | D-Bond-HF | |

Note the additional expressions - 104 and 105

TABLE 5.2

(2) Meta: Meta Information Level (MIL) 411

| FID | I | S | H |
|---|---|---|---|
| 1001 | 677 | 100(name) | Years_of_WWII |
| 1001 | 678 | 101(type) | List |
| 1001 | 679 | 104(downstream-includes dataset) | 1004 |
| 1002 | 680 | 102 | 1001 |
| 1002 | 681 | 103 | Number |
| 1004 | 683 | 100(name) | SYS123 |
| 1004 | 684 | 101(type) | List |
| 1004 | 685 | 105(upstream-belongs dataset) | 1001 |
| 1004 | 699 | 103(hadron →frame bond) | HF |
| 1005 | 686 | 102 | 1004 |
| 1005 | 687 | 103 | String |
| 1007 | 688 | 102 | 1004 |
| 1007 | 689 | 103 | Number |

TABLE 5.3

(3) Data: Main Information Level (MNIL) 412

| FID | I | S | H |
|---|---|---|---|
| 1003 | 690 | 1002 | 1939 |
| 1003 | 691 | 1002 | 1940 |
| 1003 | 692 | 1004 | 1006 |
| 1003 | 693 | 1002 | 1942 |

TABLE 5.3-continued (3) Data: Main Information Level (MNIL) 412

| FID | I | S | H |
|---|---|---|---|
| 1003 | 694 | 1002 | 1943 |
| 1003 | 695 | 1002 | 1944 |
| 1003 | 696 | 1002 | 1945 |
| 1006 | 697 | 1007 | 1941 |
| 1006 | 698 | 1005 | Pearl Harbor |

Since this is a case in which a set is a member of another set, two linguistic elements were added to Core Meta Syntax—

TABLE 5.5 elements added Core Meta Syntax (CMX) Level 410

| CMX_Code | Expression | Data Type | Allowed Values |
|---|---|---|---|
| 105 | Dataset A includes Dataset A1 | D-Bond-HF | |
| 106 | Dataset A belongs to Dataset Z | D-Bond-HF | |

The Meta Information Level 411 has five Frames. Frame FID=1001 defines the Years_of_WWII set. Frame FID=1002 is the specification (data type) for members, which belongs to dataset Years_of_WWII directly. Frame FID=1004 defines the subset {1941, Pearl Harbor}. Frames FID=1005 and FID=1007 have specification for members that belong to the enclosed subset. Since the enclosed subset has no name, the name was generated by the present invention's hadron-architecture system—"Sys123". Lines 1, 2, 3 and 4 illustrate D-Bonding relationships between frames of the Meta Information Level 411.

Partitioning in existing systems, as a rule, is based on a partitioning in accordance with the topology of a particular data structure. For instance, files are often partitioned into records. While this kind of partitioning can be satisfactory for some retrieval, it cannot satisfy more complicated queries outside the typical. The hadron architecture of the present invention provides virtually unlimited partitioning and, therefore, may provide a superior performance.

While multiple indexing is available in any data model, the hadron architecture of the present invention, by virtue of its universal hadron structure, provides more indexing power even after having built only a very few indexes (which are represented as reference number 1612 in FIG. 16). Hadron Data Storage makes a system more manageable. Hadrons 111 belong to frames 101, which track hadrons 111 when they are physically distributed into appropriate data blocks 1110. The index of a hadron block 1110 depends on the hadron type, as shown in Table 6.

Unlike in the case of any other data model, in some embodiments, the hadron data model of the present invention uses two paths of I/O to build a query result set. The first path is to obtain Specs (specifications) 122 and frameIds (FID's) 125. This path is associated with the search part of the FIND command. The second path builds the result set, which is a dataset with its own set of frames 102 and hadrons 112.

Hadron Space—Operating System Files: Contemporary computer systems have a complex multi-server architecture. A single server may have multiple disks with multiple disk controllers. To utilize this architectural complexity efficiently the logical level is needed to abstract the present invention's hadron-architecture system from a physical-level handling. This is achieved by defining a logical unit—Hadron Space (reference 220 in FIG. 2A). The Hadron Space 220 is a logical unit which is associated with one or more operating-system physical files.

Referring briefly again to FIG. 2A, it can be well demonstrated by the following hadron data language (HDL) command of the present invention's hadron-architecture system:
DEFINE SPACE my_space DATAFILE 'c:\abc\klm\file1.had' SIZE 200G;

Upon this command, an operating system upon which the present invention's hadron-architecture system has been installed and is running will create a file (reference 272 in FIG. 2A) with the name "file1.had" with the requested size. This file 272 will consist of a number of disk sectors. A disk sector is the basic unit of data storage on a hard disk. A hard disk is comprised of a group of predefined sectors that form a circle. That circle of predefined sectors is defined as a single track. The typical size of the disk sector is, for example, 512 bytes or 2048 bytes. Newer hard drives use 4096-byte (4-KB or 4-K) sectors.

When the "Define space" command is executed the appropriate number of sectors are reserved for a requested file 272. The present invention's hadron-architecture system will reformat the requested files 272 from operating system sectors (which are typically disk sectors) into hadron blocks 290. One hadron block 290 may have one or more disk sectors. A hadron space 220 may be associated with one or more files 272, but a file 272 may belong to one and only one Hadron Space 220.

When a Hadron Space 220 is full, an additional data file (reference 272 in FIG. 8A) can be added to the Hadron Space 220 by the following command:
Modify space my_space add data file "c:\abc\klm\file2.had' size 200 G'.

The present invention's hadron-architecture system includes of both programs and hadron data storage (hadrons, hadron pages, hadron blocks and hadron frames). The programs execute low-level commands (e.g., adding, dropping, bonding) written by a system programmer.

FIG. 8A is a schematic representation of a mapping 801 of a hadron space 220 to a set 819 of one or more storage devices as used in some embodiments of the present invention, which

TABLE 6

Index Layouts by Hadron Type

| Hadron Components | Index 1 | Index 2 | Index 3 | Index 4 |
|---|---|---|---|---|
| FID{Identifier, Spec, Holder} | {Spec, Holder} | {FID, Spec, Holder} | {Holder} | {FID, Identifier} |
| FID{Identifier, Spec,} | {Spec} | {FID, Spec} | | {FID, Identifier} |
| FID{Identifier} | | | {FID, Identifier} | |
| FID{Holder} | | 693 | {Holder} | {FID} | illustrates relationships between hadron blocks and OS data files on storage. The Hadron System data storage utilizes operating-system components such as I/O device management and File system. On the physical level the operating system (OS) stores data in operating-system sectors 890. OS sectors 890 are grouped into OS data files 880. The hadron system acquires initial datafiles 880 during installation.

Once the physical file is acquired it is reformatted into hadron pages 770 (see FIG. 7). Hadron pages 770 are grouped into hadron blocks 290, which in turn belong to a hadron space 220. Hadron spaces 220 and hadron blocks 290 are logical constructs, while Hadron Pages 280 and OS sectors 890 are physical constructs. OS disk sectors 890 (corresponding to sectors 272 of FIG. 2A) belong to physical operating-system files of the computer upon which the present invention's hadron-architecture system is implemented. In some embodiments, during installation, the present invention's hadron-architecture system acquires initial OS data files 880 using a command such as.

DEFINE SPACE my_space FOR DATA FILE 'c:\abc\klm\xyz\space1.had' SIZE 200 G;

In some embodiments, once the physical file 'c:\abc\klm\xyz\space1.had' is acquired, it is reformatted into hadron pages 280 (see FIG. 2A, FIG. 8A and FIG. 8B), and the following maps (e.g., including various cross-indices) will be created:

Hadron Pages—OS Sectors,
Hadron Blocks—Hadron Pages
Hadron Space—Hadron Blocks.

The physical OS disk sectors 890 (corresponding to sectors 272 of FIG. 2A) will be inventoried inside of a hadron page 280 (the "OS Sectors" map listed above). In turn, the hadron page 280 will be inventoried inside of hadron blocks 290 (the "Hadron Pages" map listed above). And the hadron blocks 290 will be inventoried inside of a hadron space 220 (the "Hadron Blocks" map listed above). The lowest level the present invention's hadron-architecture system has to deal with is the hadron page (or just "page") 280. The page 280 stores virtual hadrons 111 of the same data type.

FIG. 8B is a schematic representation of mapping 802 showing the mapping of a particular virtual hadron 111 to one or more storage devices 880, as used in some embodiments of the present invention, which illustrates relationships between hadron, hadron blocks and OS data files on storage. Referring to FIG. 8B, the task of the present invention's hadron-architecture system is to place a hadron 111 into a proper hadron page 280 using the hadron block 290 of a designated hadron space 220 as a road map.

System basic parameters of an example embodiment are shown in Tables 7 and 8. Certain basic hadron data types are represented in Table 7 below. The first three data types (1, 2 and 3) are typical data types. Data type 4 (HF-Hadron-Frame) is associated with implicit S-Bonding. There are more data types in some embodiments of the hadron-architecture system, but for the purpose of illustrating the present invention the data types in Table 7 are sufficient.

TABLE 7

(Examples of Data types)

| | |
|---|---|
| 1 | STRING |
| 2 | NUMBER |
| 3 | DATETIME |
| 4 | HF (Hadron-to-Frame) |

In some embodiments, as shown in Table 7, as it concerns data type at the CMX level, the integer "1" always indicates data of string type, the integer "2" always indicates data of number type, the integer "3" always indicates data of datetime type, and the integer "4" always indicates data of HF type.

TABLE 8

(Examples of Dataset types)

LISTS of different kinds
TREES of different kinds
GRAPHS
RECORDS
TABLES
RELATIONAL TABLES
TEXTS
MATRICES
ARRAYS The dataset types in Table 8 can be stored in the hadron-architecture system. Note that the list in Table 8 is just one embodiment. Any new dataset type can also be stored in the present invention's hadron-architecture system as well. All of the dataset types in Table 8 have different topologies, but from the present invention's Hadron Data Model point of view they are the same in that they are all stored in hadrons. Differences are in their usage of S- and D-bonding relationships. All the differences are reflected in Hadron Data Language (HDL) and not in data handling. Keeping this in mind the following description will illustrate creation and population of only one dataset type—namely, LIST.

Further information regarding the CMX Core Meta Syntax: The hadron meta syntax determines the linguistic primitive parameters of the system. In some embodiments, the set of CMX expressions is fixed for a given system version. It can be expanded whenever additional operations/dataset types are added in a new embodiment (or version). When the present invention's hadron-architecture system has been installed the following objects are created:

A. System spaces 221, and amongst them is "HADRON_SYS_MAIN".

B. A plurality of hadron system ("HS") blocks 290—one HS block 290 for each data type. These HS blocks 290 will be used for hadrons 112 associated with Meta data level 411 of the present invention's hadron-architecture system.

C. A number of SEQUENCE generators, and amongst them:
GenFID to generate Frame Identifiers (F)
GenHID to generate Hadron Identifiers (I).

D. Core Meta Syntax (CMX).

In some embodiments, the present invention provides a computerized method of organizing data according to a "hadron" data structure architecture (see, e.g., FIG. 5A). This method includes: providing a plurality of hadron blocks in a computer system, the plurality of hadron blocks including a first hadron data block, wherein each of the plurality of hadron blocks includes one or more hadron pages, wherein the first hadron data block includes a first hadron page; receiving a first plurality of data particles of a dataset, the first plurality of data particles including a first data particle and a second data particle; forming a first plurality of hadron data structures including a first hadron data structure and a second hadron data structure by creating a first frame identifier and associating the first frame identifier with the first subset to form the first hadron data structure, and creating a second frame identifier and associating the second frame identifier with the second subset to form the second hadron data structure; storing the first plurality of hadron data structures in the first hadron page; and providing a first lookup function between the frame identifiers and the data particles in the first hadron block that provides all the data particles, if any, in the first hadron block that match an input frame identifier value, and a second lookup function between the data particles and the frame identifiers in the first hadron block that provides all the frame identifiers, if any, in the first hadron block that match an input data particle value. Some embodiments further include forming a plurality of indices associated with hadrons in the first block including a first index and a second index, wherein the first index indexes between the frame identifiers and the data particles in the first hadron block, and wherein the second index indexes between the data particles and the frame identifiers in the first hadron block.

Note that in the descriptions herein, the names and numbering of features such as CMX elements and hadron system blocks are exemplary, and set forth to match the example illustrations, and the invention is not limited by any particular naming or numbering scheme.

Some embodiments of the method further include providing a plurality of hadron system blocks including at least a first hadron system block, a second hadron system block, a third hadron system block, a fourth hadron system block, a fifth hadron system block, a sixth hadron system block, and a seventh hadron system block, defining a dataset having a dataset name and a first and a second data specification by: creating a dataset-name frame identifier and associating the dataset-name frame identifier with the dataset name to form a dataset-name hadron data structure, and storing the dataset-name hadron data structure into the first hadron system block, wherein the first hadron system block includes a first index that indexes between frame identifiers and dataset names in the first hadron system block, creating a first data-specification frame identifier and associating the first data specification frame identifier with the first data specification to form a first specification hadron data structure, and storing the first specification hadron data structure into the third hadron system block, creating a second data-specification frame identifier and associating the second data specification frame identifier with the second data specification to form a second specification hadron data structure, and storing the second specification hadron data structure into the third hadron system block, wherein the third hadron system block includes a first index that indexes between frame identifiers and data specifications in the third hadron system block, associating the first data-specification frame identifier with the dataset-name frame identifier to form a first data-specification-to-dataset-name hadron data structure, and storing the first data-specification-to-dataset-name hadron data structure into the fifth hadron system block, associating the second data-specification frame identifier with the dataset-name frame identifier to form a second data-specification-to-dataset-name hadron data structure, and storing the second data-specification-to-dataset-name hadron data structure into the fifth hadron system block, wherein the fifth hadron system block includes an first index that indexes between frame identifiers and data-specification-to-dataset-names in the fifth hadron system block, making an empty first hadron data block having a first hadron data block label, making a second empty hadron data block having a second hadron data block label, associating the first data-specification frame identifier with the first hadron data block label to form a first data-specification-to-data-block-label hadron data structure, and storing the first data-specification-to-data-block-label hadron data structure into the seventh hadron system block, and associating the second data-specification frame identifier with the second hadron data block label to form a second data-specification-to-data-block-label hadron data structure, and storing the second data-specification-to-data-block-label hadron data structure into the seventh hadron system block, wherein the seventh hadron system block includes an first index that indexes between frame identifiers and data-specification-to-data-block-labels in the seventh hadron system block.

Some embodiments further include putting data into the dataset by: receiving a first data-particle and a second data-particle for the dataset, creating a first data-particle frame identifier and associating the first data-particle frame identifier with the first data-particle to form a first data-particle hadron data structure, and storing the first data-particle hadron data structure into the first hadron data block, wherein the first hadron data block includes an first index that indexes between frame identifiers and data particles in the first hadron data block, and creating a second data-particle frame identifier and associating the second data-particle frame identifier with the second data-particle to form a second data-particle hadron data structure, and storing the second data-particle hadron data structure into the second hadron data block, wherein the second hadron data block includes an first index that indexes between frame identifiers and data particles in the second hadron data block.

Some embodiments further include querying data in the dataset by: receiving a query that includes an identification of the dataset, an identification of a qualifying specification, a qualifying data particle and a target specification for the dataset, performing a lookup in the first hadron system block to find the dataset-name frame identifier based on the identification of the dataset, performing a lookup in the fifth hadron system block to find the first data-specification frame identifier and the second data-specification frame identifier based on the looked-up dataset-name frame identifier, performing a lookup in the third hadron system block to determine whether the first data-specification frame identifier is associated with the qualifying specification, and when true then performing a lookup in the seventh hadron system block to find the first hadron data block label based on the first data-specification frame identifier, performing a lookup in the first hadron data block to find the first data-particle frame identifier based on the looked-up first hadron data block label, performing a lookup in the third hadron system block to determine whether the second data-specification frame identifier is associated with the target specification, and when true then performing a lookup in the seventh hadron system block to find the second hadron data block label based on the second data-specification frame identifier, and performing a lookup in the second hadron data block to find the second data-particle based on the looked-up second hadron data block label and on the looked-up first data-particle frame identifier.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computerized method of organizing data according to a "hadron" data structure architecture, the method comprising:

providing a plurality of hadron blocks in a computer system, the plurality of hadron blocks including a first hadron data block, wherein each of the plurality of hadron blocks includes one or more hadron pages, wherein the first hadron data block includes a first hadron page;

receiving a first plurality of data particles of a dataset, the first plurality of data particles including a first data particle and a second data particle;

forming a first plurality of hadron data structures including a first hadron data structure and a second hadron data structure by creating a first frame identifier and associating the first frame identifier with the first data particle to form the first hadron data structure, and creating a second frame identifier and associating the second frame identifier with the second data particle to form the second hadron data structure;

storing the first plurality of hadron data structures in the first hadron page; and providing a first lookup function between the frame identifiers and the data particles in the first hadron block that provides all the data particles, if any, in the first hadron block that match an input frame identifier value, and a second lookup function between the data particles and the frame identifiers in the first hadron block that provides all the frame identifiers, if any, in the first hadron block that match an input data particle value;

wherein putting data into the dataset by:

receiving a first data-particle and a second data-particle for the dataset, creating a first data-particle frame identifier and associating the first data-particle frame identifier with the first data-particle to form a first data-particle hadron data structure, and storing the first data-particle hadron data structure into the first hadron data block, wherein the computer system includes an first index that indexes between frame identifiers and data particles in the first hadron data block, and creating a second data-particle frame identifier and associating the second data-particle frame identifier with the second data-particle to form a second data-particle hadron data structure, and storing the second data-particle hadron data structure into the second hadron data block, wherein the computer system includes an first index that indexes between frame identifiers and data particles in the second hadron data block.

2. The method of claim 1, further comprising:

providing a plurality of hadron system blocks including at least a first hadron system block, a second hadron system block, a third hadron system block, a fourth hadron system block, a fifth hadron system block, a sixth hadron system block, and a seventh hadron system block, defining a dataset having a dataset name and a first and a second data specification by:

creating a dataset-name frame identifier and associating the dataset-name frame identifier with the dataset name to form a dataset-name hadron data structure, and storing the dataset-name hadron data structure into the first hadron system block, wherein the computer system includes a first index that indexes between frame identifiers and dataset names in the first hadron system block, creating a first data-specification frame identifier and associating the first data specification frame identifier with the first data specification to form a first specification hadron data structure, and storing the first specification hadron data structure into the third hadron system block, creating a second data-specification frame identifier and associating the second data specification frame identifier with the second data specification to form a second specification hadron data structure, and storing the second specification hadron data structure into the third hadron system block, wherein the computer system includes a first index that indexes between frame identifiers and data specifications in the third hadron system block, associating the first data-specification frame identifier with the dataset-name frame identifier to form a first data-specification-to-dataset-name hadron data structure, and storing the first data-specification-to-dataset-name hadron data structure into the fifth hadron system block, associating the second data-specification frame identifier with the dataset-name frame identifier to form a second data-specification-to-dataset-name hadron data structure, and storing the second data-specification-to-dataset-name hadron data structure into the fifth hadron system block, wherein the computer system includes an first index that indexes between frame identifiers and data-specification-to-dataset-names in the fifth hadron system block, making an empty first hadron data block having a first hadron data block label, making a second empty hadron data block having a second hadron data block label, associating the first data-specification frame identifier with the first hadron data block label to form a first data-specification-to-data-block-label hadron data structure, and storing the first data-specification-to-data-block-label hadron data structure into the seventh hadron system block, and associating the second data-specification frame identifier with the second hadron data block label to form a second data-specification-to-data-block-label hadron data structure, and storing the second data-specification-to-data-block-label hadron data structure into the seventh hadron system block, wherein the computer system includes an first index that indexes between frame identifiers and data-specification-to-data-block-labels in the seventh hadron system block.

3. The method of claim 1, further comprising:

querying data in the dataset by:

receiving a query that includes an identification of the dataset, an identification of a qualifying specification, a qualifying data particle and a target specification for the dataset, performing a lookup in the first hadron system block to find the dataset-name frame identifier based on the identification of the dataset, performing a lookup in the fifth hadron system block to find the first data-pecification frame identifier and the second data-specification frame identifier based on the looked-up dataset-name frame identifier, performing a lookup in the third hadron system block to determine whether the first data-specification frame identifier is associated with the qualifying specification, and when true then performing a lookup in the seventh hadron system block to find the first hadron data block label based on the first data-specification frame identifier, performing a lookup in the first hadron data block to find the first data-particle frame identifier based on the looked-up first hadron data block label, performing a lookup in the third hadron system block to determine whether the second data-specification frame identifier is associated with the target specification, and when true then performing a lookup in the seventh hadron system block to find the second hadron data block label based on the second data-specification frame identifier, and performing a lookup in the second hadron data block to find the second data-particle based on the looked-up second hadron data block label and on the looked-up first data-particle frame identifier.

4. The method of claim 3, comprising:

storing the one or more hadron pages of the first hadron data block to sectors on a disk storage system; and later fetching the sectors having the first hadron data block from the disk storage system.

5. A non-transitory computer-readable storage medium containing instructions stored thereon that, when executed by one or more processors of a computer system, performs a method for implementing a "hadron" data structure architecture, the method comprising:

providing a plurality of hadron blocks in a computer system, the plurality of hadron blocks including a first hadron data block, wherein each of the plurality of hadron blocks includes one or more hadron pages, wherein the first hadron data block includes a first hadron page;

receiving a first plurality of data particles of a dataset, the first plurality of data particles including a first data particle and a second data particle;

forming a first plurality of hadron data structures including a first hadron data structure and a second hadron data structure by creating a first frame identifier and associating the first frame identifier with the first data particle to form the first hadron data structure, and creating a second frame identifier and associating the second frame identifier with the second data particle to form the second hadron data structure;

storing the first plurality of hadron data structures in the first hadron page; and providing a first lookup function between the frame identifiers and the data particles in the first hadron block that provides all the data particles, if any, in the first hadron block that match an input frame identifier value, and a second lookup function between the data particles and the frame identifiers in the first hadron block that provides all the frame identifiers, if any, in the first hadron block that match an input data particle value;

wherein putting data into the dataset by:

receiving a first data-particle and a second data-particle for the dataset, creating a first data-particle frame identifier and associating the first data-particle frame identifier with the first data-particle to form a first data-particle hadron data structure, and storing the first data-particle hadron data structure into the first hadron data block, wherein the computer system includes an first index that indexes between frame identifiers and data particles in the first hadron data block, and creating a second data-particle frame identifier and associating the second data-particle frame identifier with the second data-particle to form a second data-particle hadron data structure, and storing the second data-particle hadron data structure into the second hadron data block, wherein the computer system includes an first index that indexes between frame identifiers and data particles in the second hadron data block.

6. The medium of claim 5, further comprising instructions stored thereon that, when executed by the computer system, cause the method to further include:

providing a plurality of hadron system blocks including at least a first hadron system block, a second hadron system block, a third hadron system block, a fourth hadron system block, a fifth hadron system block, a sixth hadron system block, and a seventh hadron system block, defining a dataset having a dataset name and a first and a second data specification by:

creating a dataset-name frame identifier and associating the dataset-name frame identifier with the dataset name to form a dataset-name hadron data structure, and storing the dataset-name hadron data structure into the first hadron system block, wherein the computer system includes a first index that indexes between frame identifiers and dataset names in the first hadron system block, creating a first data-specification frame identifier and associating the first data specification frame identifier with the first data specification to form a first specification hadron data structure, and storing the first specification hadron data structure into the third hadron system block, creating a second data-specification frame identifier and associating the second data specification frame identifier with the second data specification to form a second specification hadron data structure, and storing the second specification hadron data structure into the third hadron system block, wherein the computer system includes a first index that indexes between frame identifiers and data specifications in the third hadron system block, associating the first data-specification frame identifier with the dataset-name frame identifier to form a first data-specification-to-dataset-name hadron data structure, and storing the first data-specification-to-dataset-name hadron data structure into the fifth hadron system block, associating the second data-specification frame identifier with the dataset-name frame identifier to form a second data-specification-to-dataset-name hadron data structure, and storing the second data-specification-to-dataset-name hadron data structure into the fifth hadron system block, wherein the computer system includes an first index that indexes between frame identifiers and data-specification-to-dataset-names in the fifth hadron system block, making an empty first hadron data block having a first hadron data block label, making a second empty hadron data block having a second hadron data block label, associating the first data-specification frame identifier with the first hadron data block label to form a first data-specification-to-data-block-label hadron data structure, and storing the first data-specification-to-data-block-label hadron data structure into the seventh hadron system block, and associating the second data-specification frame identifier with the second hadron data block label to form a second data-specification-to-data-block-label hadron data structure, and storing the second data-specification-to-data-block-label hadron data structure into the seventh hadron system block, wherein the computer system includes an first index that indexes between frame identifiers and data-specification-to-data-block-labels in the seventh hadron system block.

7. The medium of claim 5, comprising instructions stored thereon that, when executed by the computer system, cause the method to further include:
  querying data in the dataset by:
    receiving a query that includes an identification of the dataset, an identification of a qualifying specification, a qualifying data particle and a target specification for the dataset,
    performing a lookup in the first hadron system block to find the dataset-name frame identifier based on the identification of the dataset,
    performing a lookup in the fifth hadron system block to find the first data-specification frame identifier and the second data-specification frame identifier based on the looked-up dataset-name frame identifier,
    performing a lookup in the third hadron system block to determine whether the first data-specification frame identifier is associated with the qualifying specification, and when true then performing a lookup in the seventh hadron system block to find the first hadron data block label based on the first data-specification frame identifier,
    performing a lookup in the first hadron data block to find the first data-particle frame identifier based on the looked-up first hadron data block label,
    performing a lookup in the third hadron system block to determine whether the second data-specification frame identifier is associated with the target specification, and when true then performing a lookup in the seventh hadron system block to find the second hadron data block label based on the second data-specification frame identifier, and
    performing a lookup in the second hadron data block to find the second data-particle based on the looked-up second hadron data block label and on the looked-up first data-particle frame identifier.

8. The medium of claim 5, wherein at least a portion of a specification for the data particle in the holder of the first hadron data structure is held in the holder of the second hadron data structure, and wherein the specification pointer of the first hadron data structure includes the identifier of the second hadron data structure.

9. The medium of claim 5, further comprising:
  creating a second plurality of hadron data structures including a fourth hadron data structure, a fifth hadron data structure and a sixth hadron data structure;
  creating a second hadron frame having a frame identifier;
  altering the second hadron frame to associate the second plurality of hadron data structures with the second hadron frame;
  altering the specification pointer of one of the first plurality of hadron data structures to include the frame identifier of the second hadron frame,
  wherein at least a portion of a specification for the payload of data in the holder of the first hadron data structure is held in the second plurality of hadron data structures of the second hadron frame.

10. The medium of claim 5,
  wherein at least a portion of a specification for the data particle in the holder of the first hadron data structure is held in the holder of the second hadron data structure, and wherein the specification pointer of the first hadron data structure includes the identifier of the second hadron data structure and
  wherein at least a portion of the specification for the data particle in the holder of the first hadron data structure is held in the holder of the third hadron data structure, and wherein the specification pointer of the second hadron data structure includes the identifier of the third hadron data structure.

11. The medium of claim 5 further comprising:
  creating a second plurality of hadron data structures including a fourth hadron data structure, a fifth hadron data structure and a sixth hadron data structure;
  creating a second hadron frame having a frame identifier;
  altering the second hadron frame to associate the second plurality of hadron data structures with the second hadron frame;
  altering the specification pointer of one of the first plurality of hadron data structures to include the frame identifier of the second hadron frame;
  creating a third plurality of hadron data structures including a seventh hadron data structure, an eighth hadron data structure and a ninth hadron data structure;
  creating a third hadron frame having a frame identifier;
  altering the third hadron frame to associate the second plurality of hadron data structures with the third hadron frame; and
  altering the holder of one of the second plurality of hadron data structures to include the frame identifier of the third hadron frame.

12. A computerized apparatus that implements a "hadron" data structure architecture, wherein each one of a plurality of hadron data structures includes a frame identifier and a holder for a payload of data, wherein the plurality of hadron data structures are stored in a hadron block that provides a specification that includes metadata that specifies the payload, the apparatus comprising:
  a computer system;
  a memory and one or more processors to execute the computer instructions to:
  providing a plurality of hadron blocks in a computer system, the plurality of hadron blocks including a first hadron data block, wherein each of the plurality of hadron blocks includes one or more hadron pages, wherein the first hadron data block includes a first hadron page;
  receiving a first plurality of data particles of a dataset, the first plurality of data particles including a first data particle and a second data particle;
  forming a first plurality of hadron data structures including a first hadron data structure and a second hadron data structure by creating a first frame identifier and associating the first frame identifier with the first data particle to form the first hadron data structure, and creating a second frame identifier and associating the second frame identifier with the second data particle to form the second hadron data structure;
  storing the first plurality of hadron data structures in the first hadron page; and
  providing a first lookup function between the frame identifiers and the data particles in the first hadron block that provides all the data particles, if any, in the first hadron block that match an input frame identifier value, and a second lookup function between the data particles and the frame identifiers in the first hadron block that provides all the frame identifiers, if any, in the first hadron block that match an input data particle value;
  wherein putting data into the dataset by:
  receiving a first data-particle and a second data-particle for the dataset,
  creating a first data-particle frame identifier and associating the first data-particle frame identifier with the first data-particle to form a first data-particle hadron data structure, and storing the first data-particle hadron data structure into the first hadron data block, wherein the computer system includes an first index that indexes between frame identifiers and data particles in the first hadron data block, and creating a second data-particle frame identifier and associating the second data-particle frame identifier with the second data-particle to form a second data-particle hadron data structure, and storing the second data-particle hadron data structure into the second hadron data block, wherein the computer system includes an first index that indexes between frame identifiers and data particles in the second hadron data block.

13. The apparatus of claim 12 further comprising:

a data-structure destroyer in the computer system that drops the second hadron data structure but does not drop the first or the third hadron data structures;

a frame destroyer in the computer system that drops the first hadron frame and those ones of the first plurality of hadron data structures that are then associated with the first hadron frame; and wherein the frame destroyer deletes all data associated with those hadron data structures that are dropped.

* * * * *